US007461353B2

(12) United States Patent
Rohrabaugh et al.

(10) Patent No.: US 7,461,353 B2
(45) Date of Patent: *Dec. 2, 2008

(54) SCALABLE DISPLAY OF INTERNET CONTENT ON MOBILE DEVICES

(75) Inventors: Gary B. Rohrabaugh, Bellingham, WA (US); Scott A. Sherman, Bellingham, WA (US)

(73) Assignee: Gary Rohrabaugh, Bellingham, WA (US)

( * ) Notice: Subject to any disclaimer, the term of this patent is extended or adjusted under 35 U.S.C. 154(b) by 376 days.

This patent is subject to a terminal disclaimer.

(21) Appl. No.: 11/045,757

(22) Filed: Jan. 28, 2005

(65) Prior Publication Data

US 2005/0131887 A1 Jun. 16, 2005

Related U.S. Application Data

(60) Division of application No. 09/878,097, filed on Jun. 8, 2001, now Pat. No. 7,210,099, which is a continuation-in-part of application No. 09/828,511, filed on Apr. 7, 2001, now abandoned.

(60) Provisional application No. 60/217,345, filed on Jul. 11, 2000, provisional application No. 60/211,019, filed on Jun. 12, 2000.

(51) Int. Cl.
 *G06F 17/00* (2006.01)
(52) U.S. Cl. ................. 715/815; 715/760; 715/234; 715/239; 715/249
(58) Field of Classification Search .......... 715/517, 715/700–864
See application file for complete search history.

(56) References Cited

U.S. PATENT DOCUMENTS 5,966,135 A 10/1999 Roy et al.

(Continued)

FOREIGN PATENT DOCUMENTS

WO PCT/US01/40920 12/2001

(Continued)

OTHER PUBLICATIONS http://www.w3.org/TR/1999/WD-SVG-19990211/—Pub Feb. 11, 1999 by W3C pp. 1-7 (A complet details can be down load at by the provides URL above).*

(Continued)

*Primary Examiner*—Doug Hutton
*Assistant Examiner*—Quoc A Tran
(74) *Attorney, Agent, or Firm*—Law Office of R. Alan Burnett; R. Alan Burnett

(57) ABSTRACT

Mobile devices enabled to support resolution-independent scalable display of Internet (Web) content to allow Web pages to be scaled (zoomed) and panned for better viewing on smaller screen sizes. The mobile devices employ software-based processing of original Web content, including HTML-based content, XML, cascade style sheets, etc. to generate scalable content. The scalable content and/or data derived therefrom are then employed to enable the Web content to be rapidly rendered, zoomed, and panned. Moreover, the rendered displays provide substantially the same or identical layout as the original Web page, enabling users to easily navigate to selected content and features on familiar Web pages. Display lists may also be employed to provide further enhancements in rendering speed. Additionally, hardware-based programmed logic may be employed to facilitate various operations.

319 Claims, 22 Drawing Sheets

U.S. PATENT DOCUMENTS

| | | | |
|---|---|---|---|
| 6,011,905 | A | 1/2000 | Huttenlocher et al. |
| 6,057,854 | A | 5/2000 | Davis, Jr. et al. |
| 6,185,625 | B1 | 2/2001 | Tso et al. |
| 6,300,947 | B1 | 10/2001 | Kanevsky |
| 6,421,733 | B1 | 7/2002 | Tso et al. |
| 6,466,203 | B2 | 10/2002 | Van Ee |
| 6,546,397 | B1 | 4/2003 | Rempell |
| 6,615,212 | B1 | 9/2003 | Dutta et al. |
| 6,642,925 | B2 * | 11/2003 | Roy et al. .................... 345/427 |
| 6,674,445 | B1 * | 1/2004 | Chithambaram et al. .... 345/619 |
| 6,857,102 | B1 | 2/2005 | Bickmore et al. |
| 6,886,034 | B2 * | 4/2005 | Blumberg ................... 709/217 |
| 7,219,309 | B2 | 5/2007 | Kaasila et al. |
| 2001/0047428 | A1 | 11/2001 | Hunter |
| 2002/0112237 | A1 | 8/2002 | Ketts |
| 2004/0049598 | A1 | 3/2004 | Tucker et al. |
| 2005/0144256 | A1 | 6/2005 | Blumberg |

FOREIGN PATENT DOCUMENTS

WO     PCT/US01/40920     6/2002

OTHER PUBLICATIONS

Combined Printout of HTML Help Files for Opera 3.60 (HTML pages printed to PDF docs and combined), Available on May 12, 1999.

Screenshots compilations of Web pages using Opera 3.60, including: www.Altavista.com—May 1, 1999 www.cnet.com—May 8, 1999 www.excite.com—May 8, 1999 www.nytimes.com—Apr. 22, 1999 www.softsource.com—Apr. 17, 1999 www.utexas.edu—Apr. 27, 1999 www.uspto.gov—May 5, 1999 www.yahoo.com—May 8, 1999.

Benjamin B. Bederson et al., Pad++: A Zoomable Graphical Sketchpad For Exploring Alternate Interface Physics, Sep. 19, 1995, http://www.cs.unm.edu/pad++.

Benjamin B. Bederson et al., A Zooming Web Browser, SPIE 1996, http://www.cs.umd.edu/hcil/jazz/learn/papers/spie-96-webbrowser.pdf.

Specification for Simple Vector Format (SVF) v1.1 Jan. 16, 1995.

Specification for Simple Vector Format (SVF) v2.0 Dec. 6, 2000, http://www.svf.org/spec.html.

Changes to SVF, (Date unknown).

Scalable Vector Graphics (SVG) Specification, W3C Working Draft Feb. 11, 1999 WD-SVG-19990211, http://www.w3.org/TR/1999/WD-SVG-19990211/ (HTML format—initial page).

Scalable Vector Graphics (SVG) Specification, W3C Working Draft Apr. 12, 1999 WD-SVG-19990412, http://www.w3.org/TR/1999/WD-SVG-19990412/ (HTML format—initial page).

Scalable Vector Graphics (SVG) 1.0 Specification, W3C Candidate Recommendation Nov. 2, 2000.

Introduction to SVG, part of WD-SVG-19990211, http://www.w3.org/TR/1999/ WD-SVG-19990211/intro. html#Document . . . .

Steve Mulder, Sneak Peak at SVG, Mar. 4, 1999, http://www.webmonkey.com/99/10/index3a.html?tw=eg1999102.

Janus Boye, SVG Brings Fast Vector Graphics to Web, Jul. 29, 1999 http://www.irt.org/articles/js176/.

Vector Markup Language (VML), World Wide Web Consortium Note May 13, 1998, NOTE-VML-19980513, http://www.w3.org/TR/1998/NOTE-VML__19980513.

Precision Graphics Markup Language (PGML), World Wide Web Consortium NOTE Apr. 10, 1998, NOTE-PGML-19980410, http://www.w3.org/TR/1998/NOTE-PGML-19980410.

Rick Graham, Mobile SVG at BitFlash Inc., May 2001, http://www.w3.org/Talks/2002/1007-DI-Helsinki/bitflash/index.html.

U.S. Appl. No. 60/296,327 Available on PAIR.

U.S. Appl. No. 60/288,287, filed May 2, 2001. Available on PAIR—electronic copy previously filed via IDS submission of Sep. 18, 2007.

U.S. Appl. No. 60/296,275, filed Jun. 5, 2001. Available on PAIR—electronic copy previously filed via IDS submission of Sep. 18, 2007.

U.S. Appl. No. 60/296,237, filed Jun. 5, 2001. Available on PAIR—electronic copy previously filed via IDS submission of Sep. 18, 2007.

U.S. Appl. No. 60/296,274, filed Jun. 5, 2001. Available on PAIR—electronic copy previously filed via IDS submission of Sep. 18, 2007.

U.S. Appl. No. 60/296,284, filed Jun. 5, 2001. Available on PAIR—electronic copy previously filed via IDS submission of Sep. 18, 2007.

U.S. Appl. No. 60/296,231, filed Jun. 5, 2001. Available on PAIR—electronic copy previously filed via IDS submission of Sep. 18, 2007.

U.S. Appl. No. 60/296,224, filed Jun. 5, 2001. Available on PAIR—electronic copy previously filed via IDS submission of Sep. 18, 2007.

U.S. Appl. No. 60/296,426, filed Jun. 5, 2001. Available on PAIR—electronic copy previously filed via IDS submission of Sep. 18, 2007.

U.S. Appl. No. 60/296,273, filed Jun. 5, 2001. Available on PAIR—electronic copy previously filed via IDS submission of Sep. 18, 2007.

U.S. Appl. No. 60/296,283, filed Jun. 5, 2001. Available on PAIR—electronic copy previously filed via IDS submission of Sep. 18, 2007.

U.S. Appl. No. 60/296,281, filed Jun. 5, 2001. Available on PAIR—electronic copy previously filed via IDS submission of Sep. 18, 2007.

U.S. Appl. No. 60/296,327, filed Jun. 5, 2001. Available on PAIR—electronic copy previously filed via IDS submission of Sep. 18, 2007.

* cited by examiner

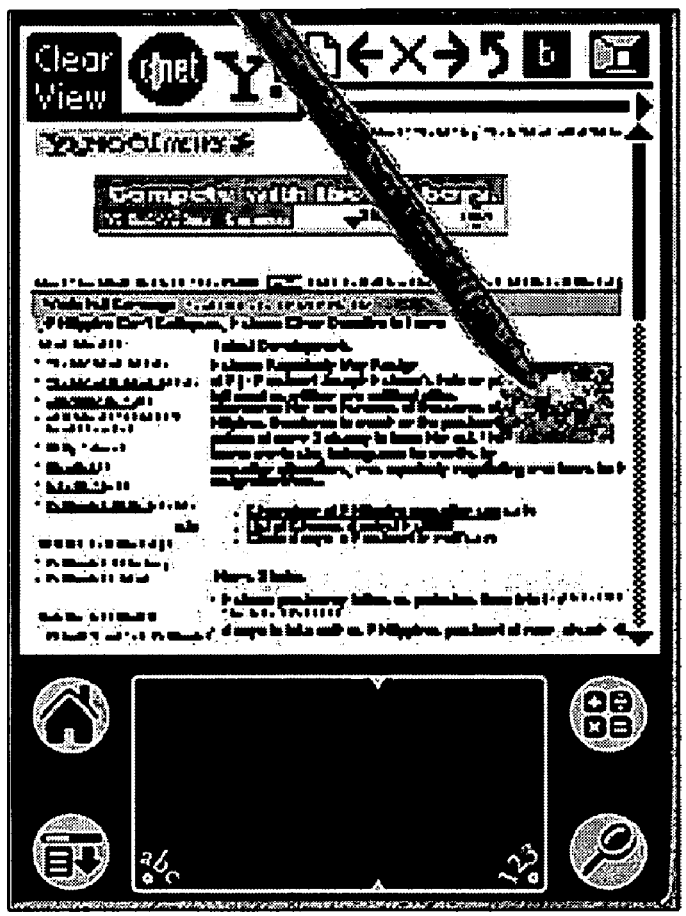
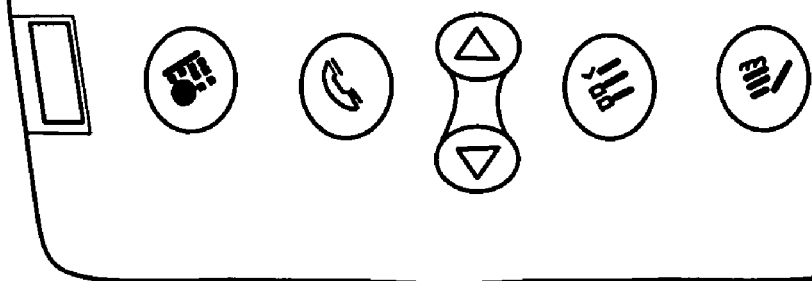

SCALABLE DISPLAY OF INTERNET CONTENT ON MOBILE DEVICES

RELATED APPLICATIONS

The present application is a Divisional Application of U.S. application Ser. No. 09/878,097, filed Jun. 8, 2001, now U.S. Pat. No. 7,210,099, which is a Continuation-in-Part of U.S. Non-Provisional application Ser. No. 09/828,511, filed Apr. 7, 2001, now abandoned, entitled "RESOLUTION INDEPENDENT VECTOR DISPLAY OF INTERNET CONTENT," the benefit of the filing date of which is claimed under 35 U.S.C. § 120. This application further claims the benefit of the filing dates of U.S. Provisional Application No. 60/211,019, filed Jun. 12, 2000, entitled "METHOD AND SYSTEM FOR RESOLUTION INDEPENDENT DISPLAY OF HTML AND XML CONTENT" and U.S. Provisional Application No. 60/217,345, filed Jul. 11, 2000, entitled "METHOD AND SYSTEM FOR SELECTION, RETRIEVAL, AND CONVERSION OF COMPUTER CONTENT TO VECTOR FORMAT FOR RESOLUTION INDEPENDENT DISPLAY," under 35 U.S.C. § 119(e).

The present application is also related to U.S. application Ser. No. 11/735,477 filed on Apr. 15, 2007, U.S. application Ser. No. 11/735,482 filed on Apr. 15, 2007, U.S. application Ser. No. 11/738,486 filed on Apr. 21, 2007, and U.S. application Ser. No. 11/738,932 filed on Apr. 23, 2007, each of which are continuations of U.S. application Ser. No. 09/878,097, now U.S. Pat. No. 7,210,099.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

BACKGROUND OF THE INVENTION

1. Field of the Invention

The invention relates generally to translation of Internet and World Wide Web content to scalable vector representation. More particularly, the invention relates to apparatus and methods for zoom enabling the display of content in an Internet information browser by retrieving and translating HyperText Markup Language (HTML), extensible Markup Language (XML), and other Internet content to vector representations of that content.

2. Description of the Related Art

Text only Internet information browsers began as a project at the CERN, European Organization for Nuclear Research, facility in Geneva Switzerland. From its inception the intent was to provide a mesh or web of access to data with a common user interface. Browsers moved from the academic environment when NCSA, the National Center for Supercomputing Applications at the University of Illinois in Urbana-Champaign developed Mosaic, an Internet information browser and World Wide Web client.

Internet content is stored in multiple file formats. These formats include HTML (Hyper Text Markup Language) and XML (extended Markup Language) as well as graphic file format GIF (Graphics Interchange Format) and JPEG (Joint Photographic Experts Group). These four file formats constitute the majority of Internet content. Font size and resizing display area for content can alter the size of the display of Internet content in existing browsers. The majority of Internet content displays as a flat single resolution with no browser support for zoom.

Much of the Internet content has been designed for display on desktop computers with a single target resolution. Even though HTML has the ability to adapt to changes in screen resolution, major Internet content providers have chosen to create their Web pages using fixed resolution structures, such as tables. This gives them the ability to control the look and feel of their Web sites. This fixed resolution approach has evolved to the point that the fixed resolution layout of Web pages has become the most common method to brand or uniquely identify Web sites. While this fixed resolution approach is good for site branding and product differentiation it does present a daunting technical problem for display of Internet content (designed for desktop computers) on small screen, low resolution, or different aspect ratio devices, such as cell phones and hand held computers.

BRIEF SUMMARY OF THE INVENTION

In accordance with aspects of the invention, mobile devices enabled to support resolution-independent scalable display of Internet (Web) content to allow Web pages to be scaled (zoomed) and panned for better viewing on smaller screen sizes are disclosed. The mobile devices employ novel processing of original Web content, including HTML-based content, XML, cascade style sheets, etc. to generate scalable content. The scalable content and/or data derived therefrom are then employed to enable the Web content to be rapidly rendered, zoomed, and panned. Moreover, the rendered displays provide substantially the same or identical layout as the original Web page, enabling users to easily navigate to selected content and features on familiar Web pages. Display lists may also be employed to provide further enhancements in rendering speed. Additionally, hardware-based programmed logic may also be employed to facilitate various operations.

According to further aspects, some mobile devices may employ touch-sensitive display screens that enable users to provide various inputs to control display of content within Web pages. Exemplary user inputs include tap-based inputs to selectively zoom in on columns, images, and paragraphs. Users can also define a window to zoom in on via the touch-sensitive display.

According to additional aspects of the invention, methods and software for enabling support for resolution-independent scalable display of Web content are provided. The methods and software enable users of various devices, from handheld devices with small screens, to desktop PC's and laptops, to very large screen devices, to view and interact with Web pages in a manner independent of the screen resolution of such device's built-in or associated display, while maintaining the look and feel of browsing such pages with a conventional desktop browser. Thus, users of various devices having different screen resolutions are enabled to browse Web pages from among literally billions of Web pages while providing a full Web browsing experience.

Other features of the present invention will be apparent from the accompanying drawings and from the detailed description that follows.

BRIEF DESCRIPTION OF THE DRAWINGS

The appended claims set forth the features of the invention with particularity. The invention, together with its advantages, may be best understood from the following detailed description taken in conjunction with the accompanying drawings of which:

FIGS. 8A and 8B are representation of nominal and zoomed in view of an exemplary graphic image as they might appear on the Palm device;

DETAILED DESCRIPTION OF THE INVENTION

Figure 1A:
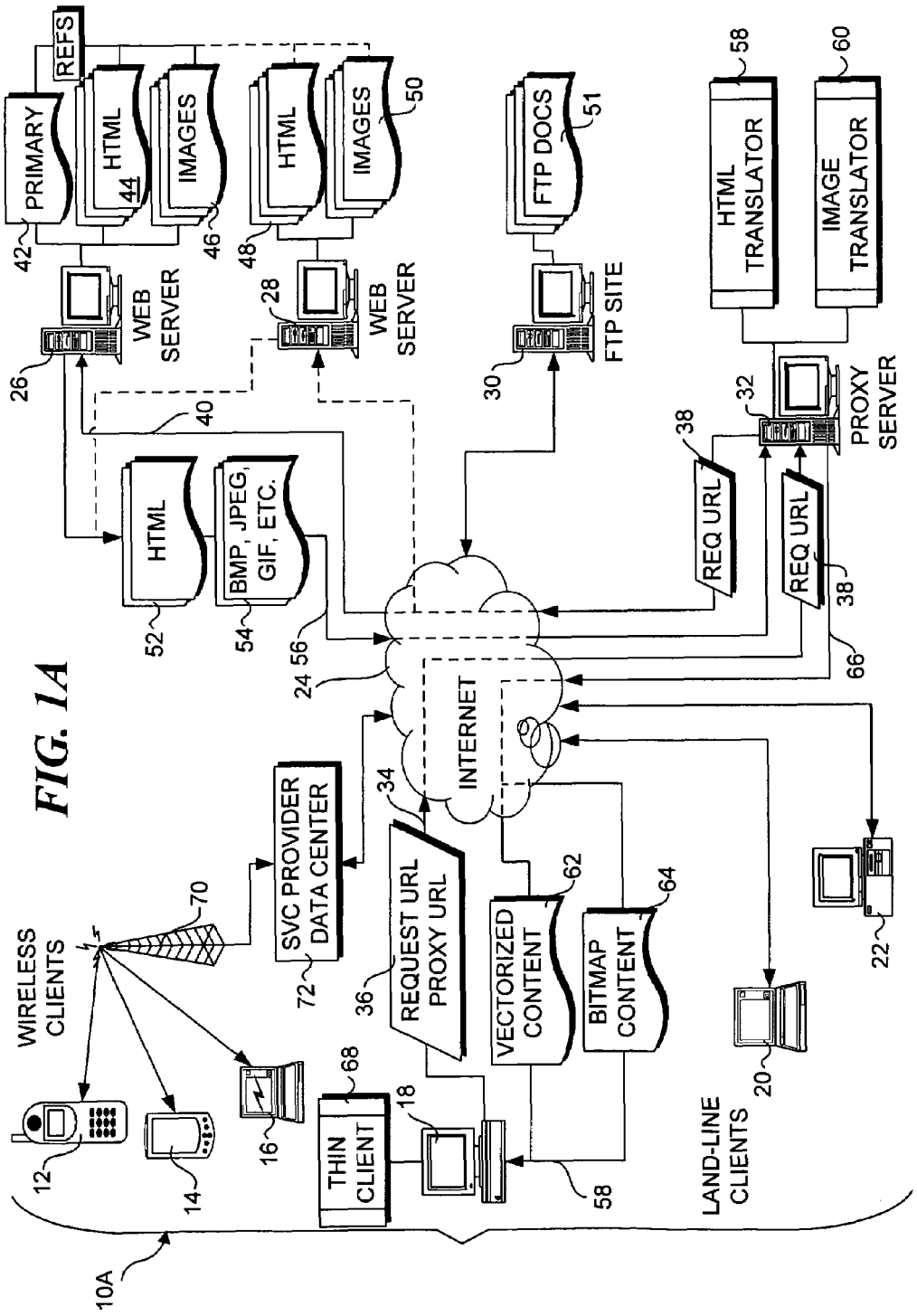
FIG. 1A is a block schematic diagram illustrating a first exemplary system infrastructure in accordance with the present invention in which content translation services are performed by a third-party proxy service that translates content requested from a client that is retrieved from one or more network resources into a scalable vector representation and delivers the translated content to the client.

Apparatus and methods are described for creating resolution independent vector display of Internet content to allow it to be scaled (zoomed) larger and smaller for better viewing or to fit any resolution or screen size. In addition, infrastructure and methods are provided for delivering such content to clients.

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention includes various operations, which will be described below. The operations of the present invention may be performed by hardware components or may be embodied in machine-executable instructions, which may be used to cause a general-purpose or special-purpose processor or logic circuits programmed with the instructions to perform the operations. Alternatively, the operations may be performed by a combination of hardware and software.

The present invention may be provided as a computer program product that may include one or more machine-readable mediums having stored thereon instructions, which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnetic or optical cards, flash memory, or other type of media/machine-readable medium suitable for storing electronic instructions. Moreover, the present invention may also be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection). Accordingly, herein, a carrier wave shall be regarded as comprising a machine-readable medium.

Client Overview

According to one embodiment, an ultra-thin client-side viewer provides the graphics, linking, caching, and function handling capabilities necessary for extending the web to almost any platform. It is designed as a lightweight browser (micro-browser) running directly on device operating systems. In alternative embodiments, the client-side viewer may be deployed as a standard browser plug-in, or Java applet for extending browser functionality. In one embodiment, the client-side viewer attains its small size and efficiency by taking advantage of the power of SVF (Simple Vector Format) to describe almost any current web content. SVF files can be handled with a tiny fraction of the client code required by normal web browsers because current browsers must interpret a large and growing number of file types and their idiosyncrasies. SVF was originally designed to handle a superset of the most commonly used file formats in the complex world of CAD. It can accommodate not only new graphical functions, but the storage and transfer of almost any foreseeable new functional capability. SVF has been under consideration by the W3C (World Wide Web Consortium) for adoption as a standard for vector content on the World Wide Web.

By working tightly with a server-side content translator, web content and functionality can be passed seamlessly to the end user platform without any degradation in the look or feel of the output. In addition, because the resulting file graphics are handled as vectors, the end user can control real time changes in the size of text and graphics as well as what portion of the file is viewable in the display. This "zoom and pan" capability, familiar to CAD and other vector content software users, adds dramatically to the usability of non-standard display sizes. For very small displays, real time zooming and panning allows the user to see graphics and text at sizes that make them easily readable, and then "back up" to view an entire page for context or pan in any direction for navigation. Because the client-side viewer manipulates vectors, there is no loss in quality as the display is zoomed. The graphics rendering engine within the client is so efficient that file manipulation happens in a fraction of a second. There is no perceptible wait for the user as the file is resized, or the window is repositioned. Content created for one display resolution now can be sized, real time, for any other display without degradation. Besides making small displays eminently usable, this technology extends web content into some surprising new arenas. For example, it enables normal desktop displays to be effective for individuals with visual impairment, or for content designed for 640×480 standard PC monitors to be shown without degradation on web billboards now appearing in cities like Seattle and San Francisco.

With a client of such extraordinary power packed in a tiny footprint, end user device manufacturers can free up valuable memory space for pre-fetching, caching and pre-loading content, dramatically improving performance for use in low bandwidth and portable applications. In the example of a wireless handheld device where expensive flash memory must be used instead of more cost effective bulk storage technology, the difference between consuming 10's of megabytes of flash memory with a standard browser versus running the client-side viewer described herein is dramatic.

Those "saved" megabytes of memory are now available for impressive interfaces, caching of often used content, and pre-fetching of intelligently selected linked files or pre-loading of content for targeted applications. For example, in a mapping application, the map tiles surrounding the viewed map could be downloaded and stored while the user was working with the initial tile, enabling an experience remarkably free from the current frustrations of waiting for a new map to be transferred for even the smallest change in magnification or coverage. If the user knows ahead of time what city they will visit on a business trip, maps and additional travel information in great detail could also be pre-loaded using a high bandwidth connection at home or in the office before heading out to shop or conduct business in the city. Additionally, SVF is a more efficient way to store web content. Resulting content files are reduced in size by anywhere from 20 to 80 percent over their source. SVF is also very compressible. With target file size reduction in the range of 90%, SVF files can take up as little as $1/10^{th}$ the space of the web files in current use. This means that pre-translated content can be moved up to 10 times the rate of current web pages, and as much as 10 times as many pages, maps, stock charts, etc. can be stored for instant retrieval on the hand held platform as can be handled with current web technology.

When used on content created natively in SVF, additional capability can be extended to the client-side viewer.

Graphing the performance of stocks over time is only one use of SVF's ability to handle streams of data. Handling the output from financial systems, transactional systems, ERP packages, and CRM systems becomes easier and more flexible. Of course, systems integrators don't have to use these powerful capabilities to start with. If the target system provides web interfaces, these can be viewed, as designed, with no additional software to write, and no changes to the design or layout of the interface.

Server Overview

Enabling the client-side viewer to be so small and powerful is the server-side content translator. The server-side content translator rapidly translates Web content to SVF, compresses and encrypts the SVF results if desired, and transfers the vector formatted results to the client-side viewer. Alternatively, SVF files can be cached or stored in a file system for fetching and transfer at a later time. Pre-translated or cached content transfers are significantly faster as no conversion overhead is incurred, and file sizes are reduced using the more efficient SVF. Combine that with standard compression algorithms selectable for use with the client-side viewer for additional performance improvements.

During the translation process, and in the process of serving cached, pre-translated, or native SVF content, output files are "streamed" to the client-side viewer. Although this does not decrease the total time for file transfer, it can significantly improve the effective system performance for the end user. Content can be selectively streamed, with text and links coming through first, followed by graphic images and other content, for example. Should the user be accessing a link, rather than having interest in the entire file served, links can be selected early in the transfer and the next file download started immediately. In addition to streaming, the server-side content converter may also layer the content by type. This means that text can be put in one layer, links in another, GIF images in another, Javascript in another and so on. Layers can be turned on or off depending upon client capabilities, making files for less capable clients, or for users interested in a reduced functionality, higher transfer performance mode to be handled automatically.

All operational modes may be controlled through an administrative interface or accessible through a straightforward API (Application Program Interface). Furthermore, the system works with existing firewalls and within standard security protocols. In more secure modes, the server-side content converter and the client-side viewer may operate using Public/Private key authentication and encryption.

Exemplary System Infrastructures

Figure 1B:
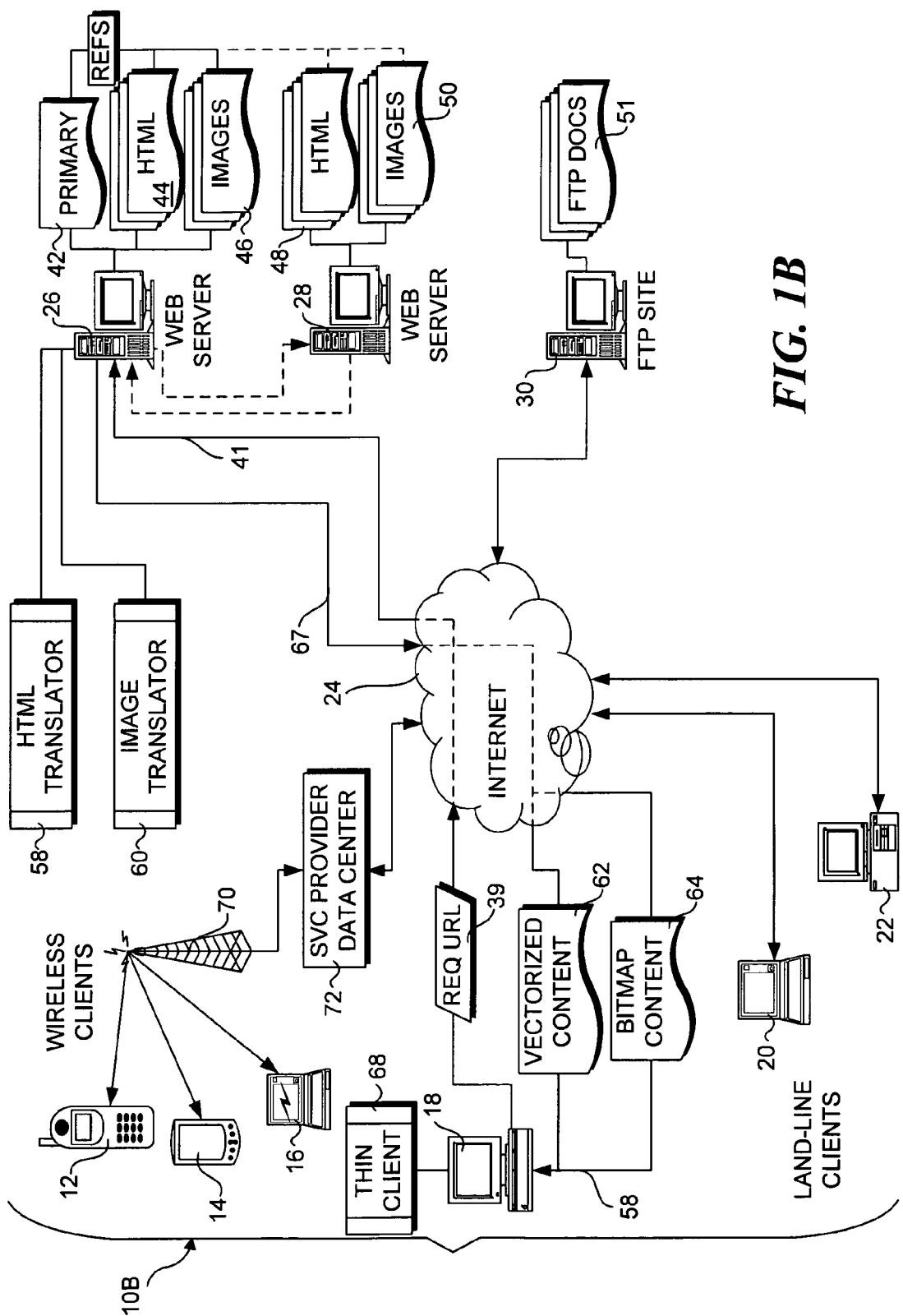
FIG. 1B is a block schematic diagram illustrating a second exemplary system infrastructure in which the translation of content is performed at a content provider's web site and delivered directly to the requesting client.
Figure 1C:
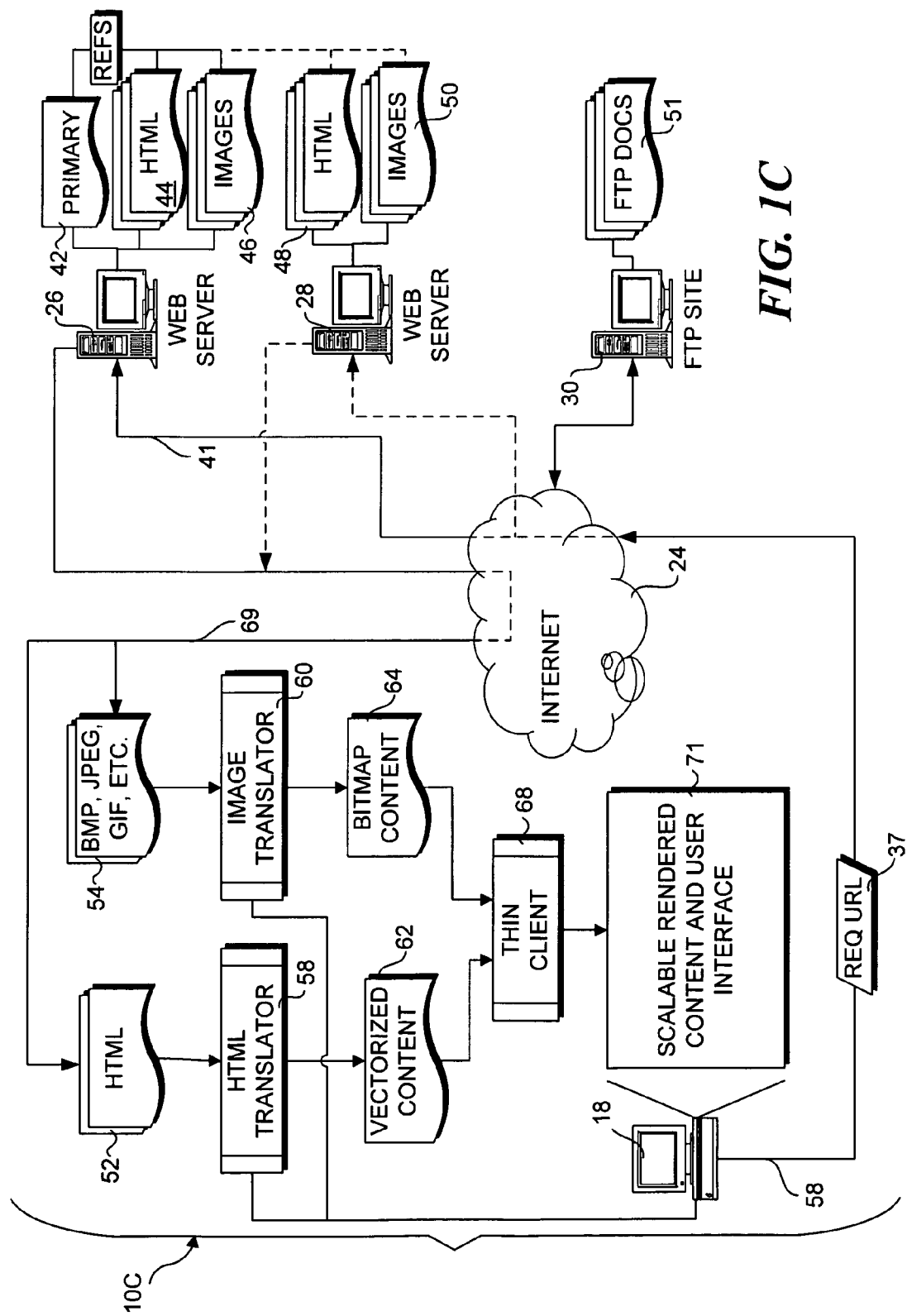
FIG. 1C is a block schematic diagram illustrating a third exemplary system infrastructure in which content received from one or more network sources is translated into a scalable vector representation at the client.

In the following paragraphs, a description of three exemplary system infrastructures is provided. Schematic illustrations of these system infrastructures are shown in FIGS. 1A, 1B, and 1C. It is noted that like-numbered components in these Figures perform substantially the same function. Therefore, any discussion of the functions of a component with reference to one or more of the infrastructures generally may apply to the other infrastructures as well, unless specifically noted otherwise.

A first of exemplary system infrastructure 10A for implementing the invention is shown in FIG. 1A. Infrastructure 10A enables various clients, including wireless devices such as a cellular phone 12, a wireless-enabled PDA 14, and a wireless-enabled laptop computer 16, as well as landline computers 18, 20, and 22, to request content that is accessible via a network such as the Internet 24 to be retrieved from selected network resources, including web servers 26 and 28 and an FTP site 30, wherein the content is translated into a scalable vector representation (e.g., SVF, also referred to herein as "vectorized content") through use of a proxy server 32 and sent to the requesting client. Upon being received by the client, the vectorized content is processed and rendered using a thin client to enable a user to view the content on the client device.

Figure 2A:
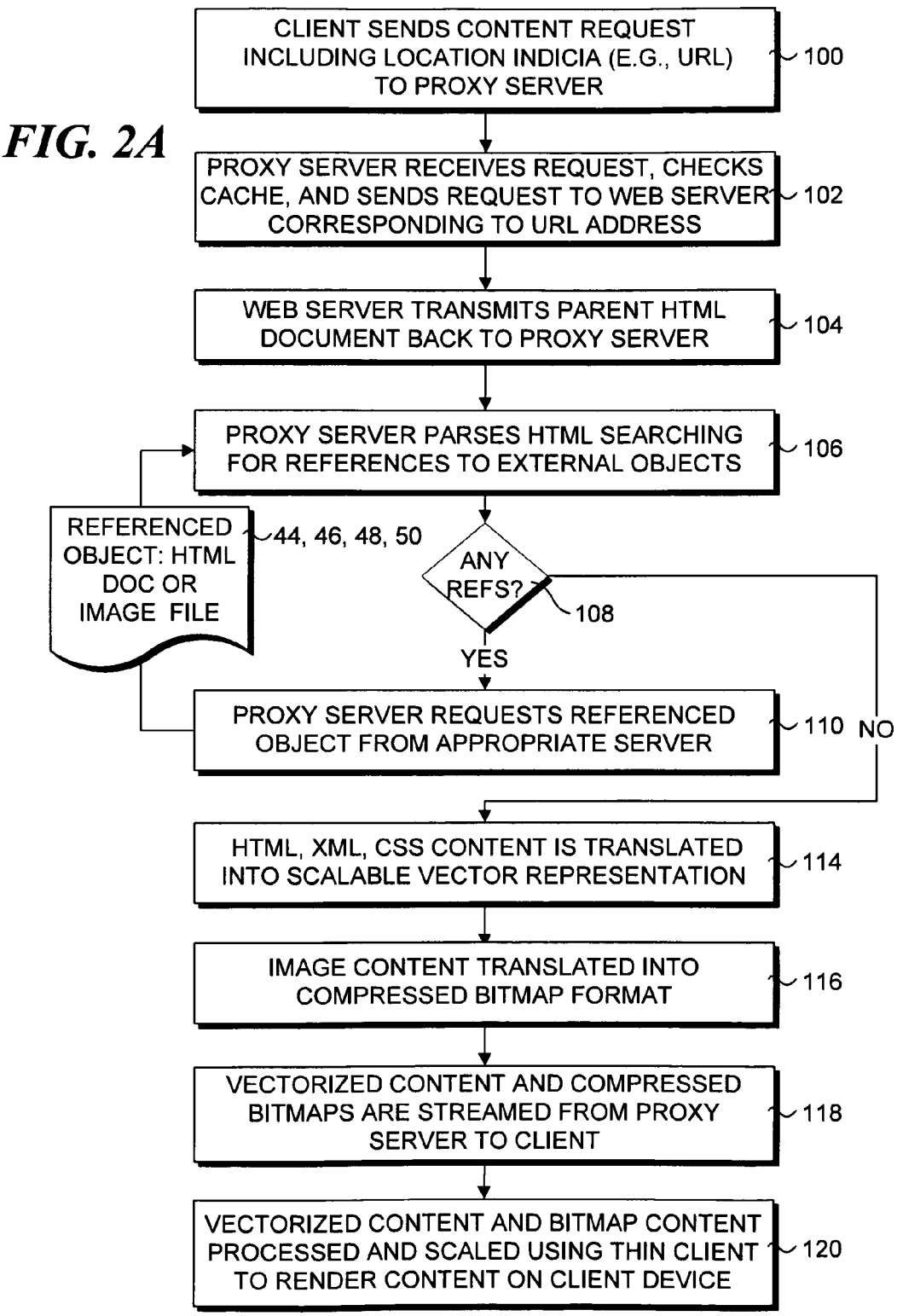
FIG. 2A is a flowchart illustrating how data is retrieved, processed and transferred in accordance with the system infrastructure of FIG. 1A.

With reference to the flowchart of FIG. 2A, the foregoing process is initiated by a client in a block 100, wherein the client submits a request to proxy server 32 to retrieve and convert selected content. As depicted by a transfer path 34, this comprises sending data 36, which includes content network location indicia from which the content can be retrieved and proxy server network location information by which the content request may be delivered to over Internet 24 to proxy server 32. Typically, it will be desired to retrieve a particular web page. Accordingly, the content network location indicia will comprise a URL (uniform resource locator) for the web page. Similarly, the proxy server network location information may also comprise a URL corresponding to a network access point for the proxy server. Optionally, the location information may comprise a network IP address for one or both of the content location and the proxy server location. If the content is to be retrieved from an Internet resource, the request will typically be sent using the HyperText Transfer Protocol (HTTP) over the TCP/IP transport.

Next, in a block 102, the request is received by the proxy server and the proxy server checks its cache to see if it already has the request content in its cache. If it does, it sends this cached content back to the client. If it does not have the requested content cached, the proxy server sends out a request to retrieve the content from the network resource. For illustrative purposes, it will be assumed for the present example that the desired content comprises a web page that is stored on web server 26. Typically, when the requested content comprises a web page, the content may be retrieved using conventional web content retrieval techniques, such as that employed by various modem browser clients, including Netscape Navigator and Internet Explorer. This generally comprises providing routing information, such as the URL for the web page (URL 38) to routing services provided by Internet 24, which routes the request to an appropriate network resource (e.g., web server 26), as depicted by a transfer path 40.

Typically, the URL will correspond to a web page whose content is stored by the web server in an HTML (HyperText Markup Language) document comprising HTML code and embedded text content, in addition to other optional content languages, that may contain references to other objects (e.g., HTML documents and graphic image files) stored locally to the server or stored on a remote server. For example, the HTML content corresponding to a single-frame web page is often stored in a single file, while multiple-frame web pages may comprise content that is stored in a single file or in multiple files. These files may be stored locally on the web server (e.g., on one of the server's hard disks), or on a local storage device connected to the web server via a local area network (LAN), such as a network attached storage (NAS) filer. Optionally, some of the web page's content may comprise one or more documents that are stored at remote locations that may be accessed via a WAN (wide area network) or the Internet.

HTML is a standardized language that describes the layout of content on a web page, and attributes of that content. This layout and attribute information is defined by sets of tags contained in HTML code corresponding to the page. The tags define various HTML layout and display information, including tables, paragraph boundaries, graphic image positions and bounding box sizes, typeface styles, sizes, and colors, borders, and other presentation attributes. A portion or all of a web page's text content may be contained in the parent HTML document corresponding to the URL. In addition to basic HTML, web page documents may contain XML (eXtensable markup language) code, as well as scripting language code, such as javascript. However, for simplicity, any documents containing web page content other than only graphic content that are discussed herein will be referred to as HTML documents.

In addition to HTML and other markup and scripting language content, it is very common for web pages to include graphical content. In general, graphical content is usually stored in an image file or files that are external from the parent HTML document for the web page. For example, the parent HTML document may contain one or more embedded image tags that reference the location where those images are stored. As before, the graphic images may be stored locally, or may be stored on remote servers that are accessed by the web server via a WAN, or the Internet. These files will typically comprise data stored in one of several well-known graphic formats, including bitmap files (BMP), GIF (Graphics Interchange Format) files, and JPEG (Joint Photographic Experts Group) files.

In response to receiving the request for content, web server 26 begins sending a parent HTML document 42 back to proxy server 32 in a block 104. In a block 106, the HTML content of the parent HTML document is parsed to search for references to external objects such as HTML frames and graphics. In a decision block 108, a determination is made to whether any references are found. For each reference to an external object that is found, proxy server 32 requests to have the object retrieved from an appropriate network resource (e.g., a web server) in a block 110, and data corresponding to the object is transmitted back to the proxy server, as depicted by locally accessible HTML documents 44 and graphic images 46, as well as remotely accessible HTML documents 48 and graphic images 50, which may be accessed via web server 28. If the external object is a graphic image, there is no further processing of the object at this point. If the object is an HTML document, the functions provided by blocks 106 and 108 are repeated. Generally, this set of processing functions is repeated iteratively until all of the external objects are retrieved. However, as described below, there will be some instances in which certain objects will be retrieved at a later point in time. In addition to content stored on web servers that are accessed using HTTP, content may also be retrieved from various network sites using the File Transfer Protocol (FTP), such as FTP documents 51, which are accessed via FTP server 30.

In general, HTML documents and graphic files will be sent as packetized data streams using HTTP over one or more TCP/IP network connections, wherein the data streams will usually be asynchronous. Retrieval of HTML documents and graphic files corresponding to the embedded references will usually require additional transfer time. Furthermore, graphic content oftentimes comprises significantly larger file sizes than HTML content, leading to significant transfer times in some instances. For simplicity, the transfer of the various HTML documents and graphic files for the content request are depicted by HTML documents 52 and graphic documents 54, which are transferred over a transfer path 56.

When the HTML documents and graphic content are received by proxy server 32, a scalable vector representation of the web page is generated in a block 114 by an HTML translator 58. In brief, HTML translator 58 translates HTML, XML, and cascaded style sheet (CSS) layout content into a scalable vector representation, such as SVF. Details of the HTML translation process are contained below. In addition, the graphic images are converted into a compressed bitmap format in a block 116 by a graphics translator 60. The vectorized content 62 and compressed bitmaps 64 are then streamed back to the client (i.e., computer 18) in a block 118, as depicted by a transfer path 66. In one embodiment, the content portions are sent in separate streams using multiple connections. In another embodiment, the content portions are sent via a multiplexed stream using a single connection. As the vectorized content and compressed bitmap data are received by the client device, they are processed by a thin client 68 running on the client device, whereby a representation of the original web page content may be rendered on the client device's display screen at various user-selectable scaled resolutions and pan offsets in a block 120, thereby enabling a user to more clearly see an overview or details in the web page. Further details of the client side processing are provided below.

As discussed above, wireless clients may also access the vectorized network (e.g., web site) content provided via proxy server 24. The majority of this process is identical to that described above for land-line clients (e.g., computers 18, 20, and 22), except for provisions required for sending data to and receiving data from wireless devices. In general, most wireless devices will access the Internet via a wireless service provider (i.e., a wireless telecommunications carrier) that is particular to that wireless device. Accordingly, a portion of the transmission path to and from proxy server 24 will comprise infrastructure provided by that service provider and/or shared with other service providers. For simplicity, this infrastructure is shown as a cellular tower 70 and a service provider data center 72, although it will be understood by those skilled in the art that the connection path may comprise additional infrastructure components, including appropriate gateways and routers, that enable wireless devices to access proxy server 24.

In some implementations, there will be no special formatting/protocol services that need to be performed by proxy service 24—from the viewpoint of the proxy service, it will be immaterial whether the client is a land-based or wireless client; the special handling provisions for wireless devices will be handled entirely by the service providers infrastructure transparently at both ends of the communications path. In other instances, it may be desired or necessary to reformat the data content delivered to the wireless device at the proxy service. This will generally be dependent on the particular wireless protocol used, and what services are provided by the service provider for the wireless client.

Currently, in the United States, wireless clients generally access Internet 24 by using the Wireless Application Protocol (WAP). In Japan, the most popular access means is NTT DoCoMo's i-Mode wireless protocol. In addition to these wireless standards, new standards are anticipated to be in force in the near future, including NTT DoCoMo's FOMA (Freedom of Mobile Multimedia Access), which is transported over W-CDMA (Wideband Code Division Multiple Access), and CDMA-2000. For the purposes of the invention herein, it will be understood that those skilled in the mobile telecommunications arts will be knowledgeable about any particular format and/or transport protocol requirements that pertain to the particular protocol that is to be used.

A second exemplary system infrastructure 10B for implementing the invention is shown in FIG. 1B. As will be readily recognized, much of infrastructure 10B is similar to infrastructure 10A; however, rather than have a separate proxy server perform the proxy functions (retrieve and translate content), these functions are performed on machines operated by the web site in infrastructure 10B.

Figure 2B:
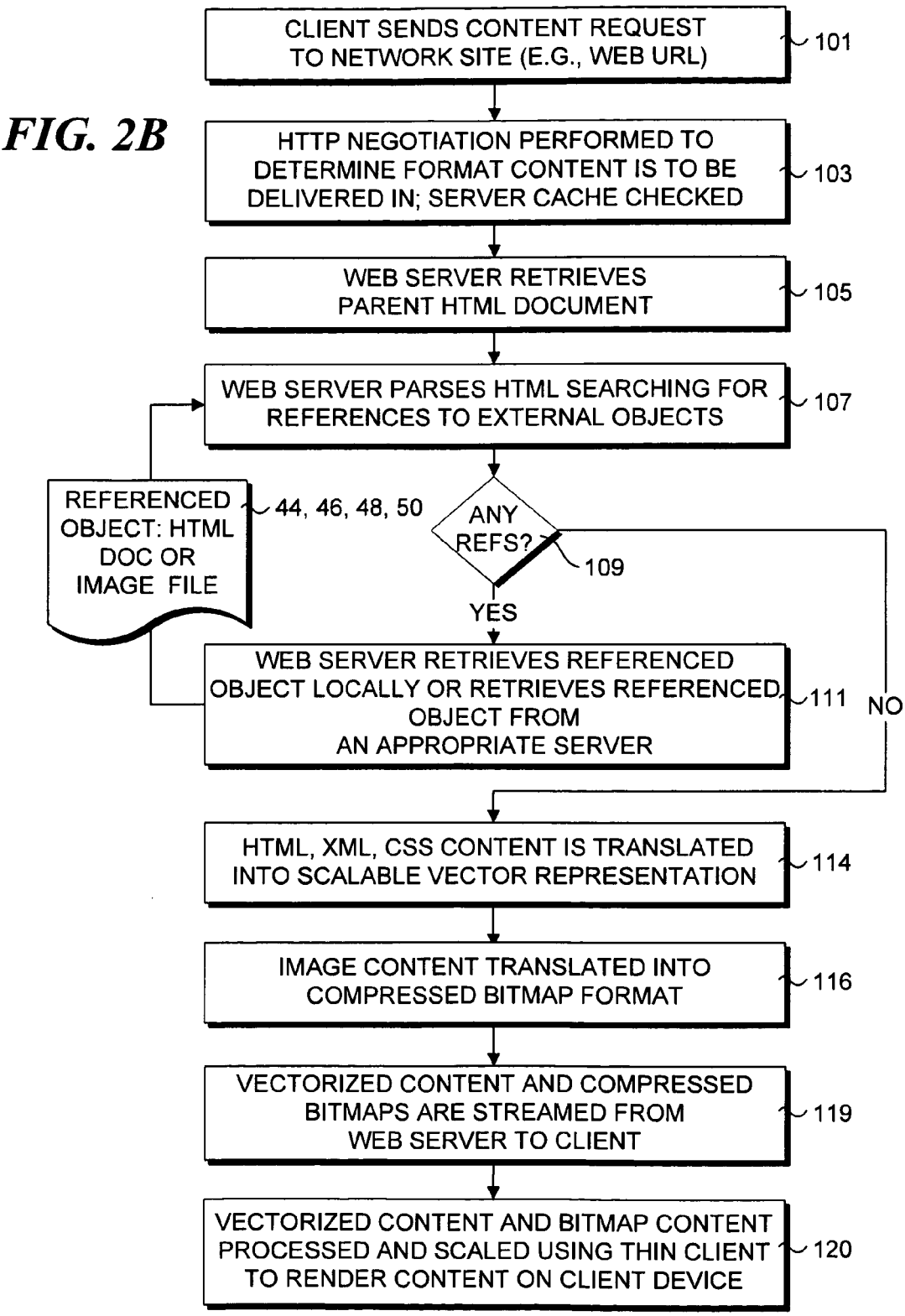
FIG. 2B is a flowchart illustrating how data is retrieved, processed and transferred in accordance with the system infrastructure of FIG. 1B.

The logic implemented by the invention when providing content to a client using infrastructure 10B is illustrated in the flowchart of FIG. 2B, wherein the process begins in a block 101 in which the client sends a content request 39 directly to the network site (e.g., web server 26), as depicted by a transfer path 41. In a block 103, HTTP negotiations are performed to determine the format the content is to be delivered in. For example, the request may contain indicia identifying the type of content requested, such as an SVF MIME type (e.g., image/vnd.svf). This is to inform the web server that the request is for specially-formatted content rather than conventional content. The server first checks to see if it already has cached the requested content. If it has, it sends the content to the requesting client; otherwise, it retrieves the parent HTML document in a block 107. It then performs processing steps in blocks 107, 109, and 111 to retrieve content referenced through embedded tags in a manner substantially similar to that discussed above with reference to respective blocks 106, 108, and 110. The primary difference in this instance is that the web server does not receive requests from or send documents to a proxy server—rather, the content is retrieved and processed at the web server, wherein the retrieved content may be stored local to the web server or retrieved from a remote server in a manner similar to that described above.

As before, the retrieved HTML documents are translated into scalable vector representations by HTML translator 58 in a block 114, while the graphic images are translated into a compressed bitmap format by image translator 60 in a block 116, as depicted by vectorized content 62 and bitmap content 64. The vectorized content and bitmap content are then streamed from the web server to the client in a block 119, as depicted by a transfer path 67. Upon arriving at the client, the vectorized content and bitmap content are processed, scaled, and rendered on the client in a block 120.

Figure 2C:
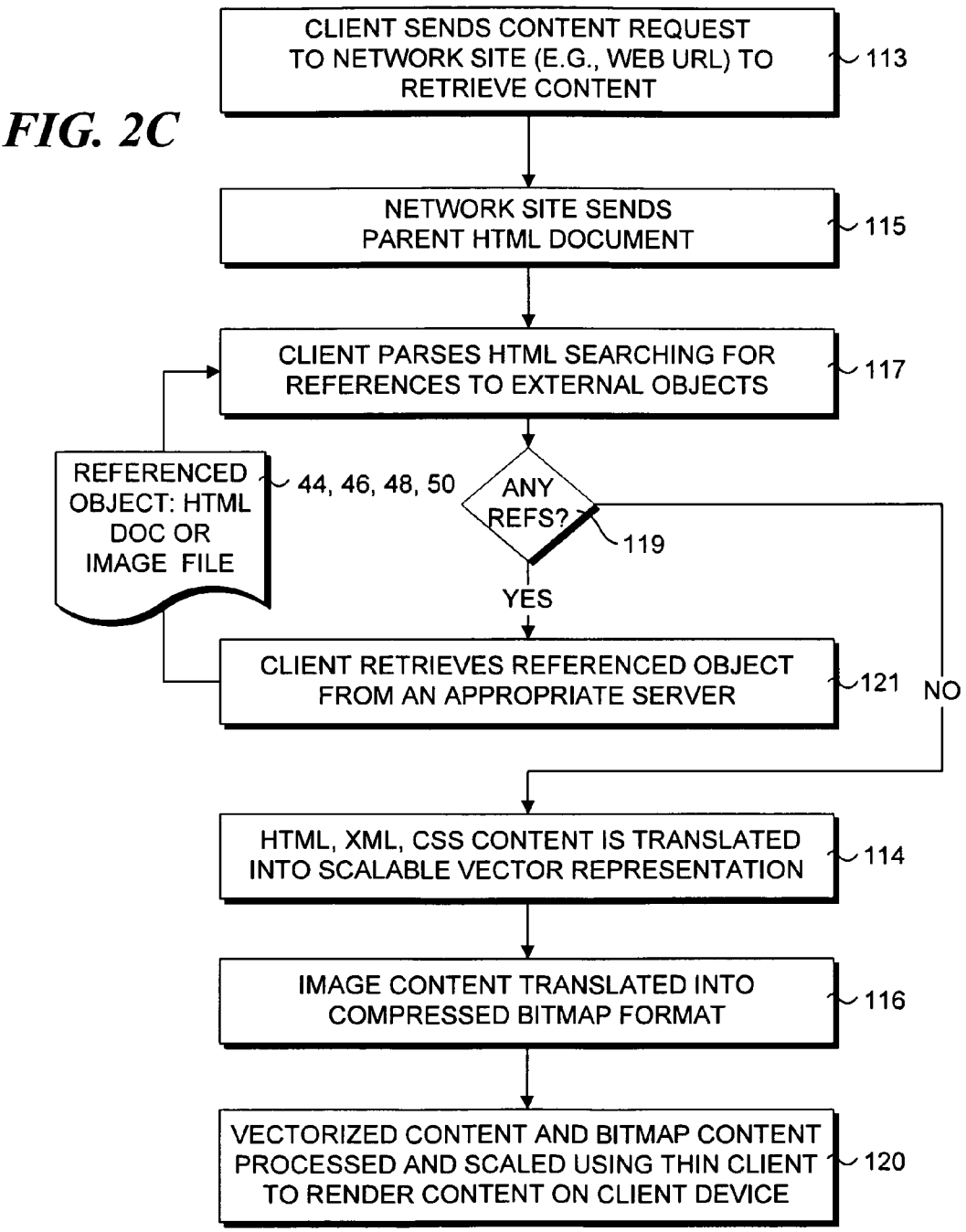
FIG. 2C is a flowchart illustrating how data is retrieved, processed and transferred in accordance with the system infrastructure of FIG. 1C.

A third exemplary system infrastructure 10C for implementing the invention is shown in FIG. 1C. In this configuration, the proxy functions are performed at the client. As shown by a block 113 in FIG. 2C, the process for providing vectorized content to a client in accordance with infrastructure 10C begins in a block 113, in which the client sends a content request 37 to a network site, such as web server 26, via Internet 24. In response, the network site retrieves the parent HTML document and sends it to the requesting client in a block 115. In a manner similar to that discussed above with reference to blocks 106, 108, and 110 of FIG. 1A, the client first parses the parent HTML document searching for embedded references to external objects and retrieves these objects, whereupon the embedded reference search is performed on the newly retrieved document until all of the content corresponding to the original content request has been retrieved. This content is depicted by HTML documents 52 and image files 54, which are sent from the network site to the client via a transfer path 69. At this point, the client performs translations on the HTML content and the graphic image content that are substantially similar to that performed by the proxy server in FIG. 1A or at the web site in FIG. 1B, as provided by blocks 114 and 116. The vectorized and image content is then processed and scaled by thin client 68 in a block 120, as depicted by device output 71.

Attention now is focused on the functionality provided by proxy server 24 in system infrastructure 10A of FIG. 1. Fundamentally, the proxy server functions as a proxy. It accepts requests for content from client devices as full URLs using standard HTTP mechanisms carried over a multiplexed TCP connection. Standard HTTP content negotiations features specify the formats in which content is to be delivered (SVF, bitmap, and possibly others, which can be handed off to cooperating client-side display software). As described in further details below, in some embodiments the proxy server appears for the client as a normal proxy (that is, the client knows it is retrieving content via the proxy), while in other embodiments the proxy is transparent to the client.

The proxy server responds to client content requests by delivering content in one of the requested formats, by retrieving the content in an appropriate format from its cache, or from an upstream content source (again using standard HTTP content negotiation features), or by translating upstream content from a supported original format to SVF or the client bitmap format.

Requests from the server installation to its cache and from the cache to upstream content sources are made in HTTP carried over TCP using simple straightforward Web content requests. For example, requests from clients to the proxy server comprise HTTP proxy requests (e.g., "GET http://www/xyz.com/some_page.html HTTP/1.0 . . . ") carried over TCP or over a lightweight multiplexing protocol over TCP. The multiplexing protocol allows the server to push image thumbnails to the client before the SVF stream is available, as well as offering a channel for control and status information, more simultaneous channels than the client operating system may support, and a mechanism for prioritizing information flow from server to client under loose client control. In addition to HTTP requests, the proxy server architecture supports other user-level protocols, such as FTP and Gopher.

Figure 3:
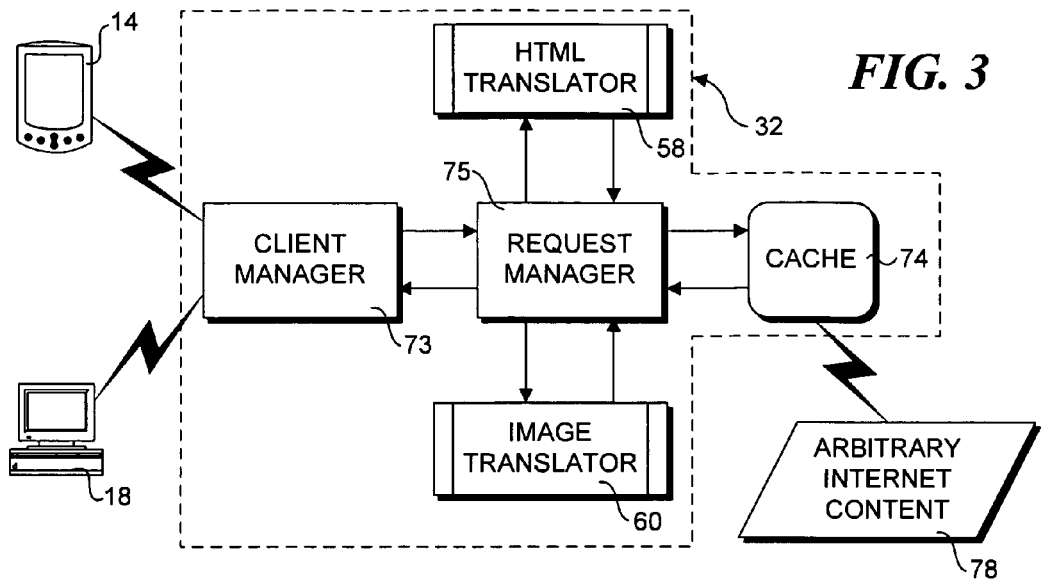
FIG. 3 is a block schematic diagram illustrating an exemplary architecture corresponding to the proxy server of FIG. 1A.

Details of some of the primary components of the proxy server architecture are shown in FIG. 3. Internally, the proxy server comprises a suite of coordinated processes connecting to upstream content through an HTTP cache 74. In one embodiment all functions except caching are performed in a single process, wherein multiple threads are used to effect asynchronous I/O. Separate processes communicated via persistent multiplexed connections carried over the most efficient reliable transport available (e.g., Unix sockets over single processor and symmetric multiprocessor (SMP) computers; TCP sockets between separate computers). All processes are capable of servicing multiple requests simultaneously. No process maintains client state outside the context of a single request, so all components can be repeated and load balanced across multiple CPU's of an SMP computer or across separate computers on a LAN.

The various content translators used by the proxy server accept (via HTTP PUT) or request (driven by HTTP proxy GET/POST) content in supported, but client-unsupported, formats; and return (via HTTP PUT or GET/POST response) one or more representations of that content in a client-supported format. In the embodiments illustrated in FIG. 1A-C, two translators are used: HTML translator 58 and image translator 60. Future content types may be accommodated by new translators, by extending existing translators to cover the new content types, or by extending the client's capabilities. Standard HTTP content negotiation mechanisms are used to inform the proxy server of the client's capabilities and expectations on each request.

Managers at the proxy server coordinate the operations of other components. Two managers are presently defined; a client manager 73 that handles client proxy requests, and a request manager 75 that handles unproxied HTTP requests from other services. The managers accept requests, attempt to service them from HTTP cache 74, and drive HTML translator 58 and image translator 60 when content does not match the clients' requirements. Managers also handle translator requests for inline content (e.g., image dimensions for page layout), and push translated content into HTTP cache 74. Additionally, the client manager coordinates delivery of primary and inlined content, and provides process and status information to the clients.

As discussed above, HTML translator 58 creates a scalable vector representation of the original HTML content of a requested web page. In order to better explain how translation of HTML content is performed, one embodiment of a translation process is described below as applied to an exemplary web page. In addition, details of conventional web page client and server-side processing are provided so as to clarify how web content is laid out during a pre-rendering process on the client.

FIG. 4 shows a representation of a web page 210 served from an exemplary stock brokerage Internet web site as it would appear when rendered on a modern Internet browser, such as Microsoft's Internet Explorer or Netscape's Navigator. Web page 210 is exemplary of many web pages that implement frames, and includes two adjacent frames 212 and 214. A logo graphic object 216A is displayed at the top of frame 212, which additionally includes a "MARKETS" text header 218A, an "INVESTMENTS" text header 220A, and a plurality of links with overlaying graphic objects, including a "DOW" link 222A, a "NASDAQ" link 224A, an "OPTIONS" link 226A, a "CHARTS" link 228A, a "MUTUAL FUNDS" link 230A, a "IRA, 401K OPTIONS" link 232A, and a "TAX INFORMATION" link 234.

A horizontal group of links 236 is disposed at the top of frame 214, and includes a "QUOTES" link 238A, a "HOT PICKS" link 240A, a "CALENDARS" link 242A, and a "NEWS" link 244A. An advertisement banner 246A is displayed just below the horizontal group of links and just above a "NEWS SPARKS MARKET" headline 248A. Frame 214 also includes a pair of graphic image objects, including a DOW chart 250A and a NASDAQ chart 252A. A set of user input objects is disposed adjacent to DOW chart 250A within a graphic object 254A, including an "ACCOUNT #" input box 255A, an "ACCESS CODE" input box 256A, and a "LOGIN" button 257A. In addition to the foregoing objects, frame 214 also includes text objects 258A and 260A.

An HTML listing corresponding to web page 210 is presented below as LISTING 1. Note that LISTING 1 sometimes refers to object descriptions and link paths rather than the text or path location of actual objects for simplicity, and that other elements commonly found in HTML pages, such as META entries, are omitted for clarity.

Listing 1

```
1.    <html>
2.    <head><title>"MARKET HOME"</title></head>
3.
4.    <body bgcolor="#FFFFFF" link="0033CC" vlink="0033CC">
5.
6.    <frameset cols="25%,75% frameborder=0 border=0>
7.    <frame>
8.    <align=left><align=top>
9.    <img src="/directory path/logo.gif" align = left border="0" height="80" width="100">
```

-continued

```
10.     <br><br>
11.     <t3>TEXT HEADER #1 align=left</t3><br>
12.
13.     <table width="90%" border=0 cellspacing=10 cellpadding=0 bgcolor="#000000"
14.       align=center>
15.         <tr>
16.             <a href="URL or path for LINK #5" <img src="/directory
17.             path/GRAPHIC#2" height="50" width ="150"></a>
18.         <tr>
19.             <a href="URL or path for LINK #6" <img src="/directory
20.             path/GRAPHIC#3" height="50" width ="150"></a>
21.         <tr>
22.             <a href="URL or path for LINK #7" <img src="/directory
23.             path/GRAPHIC#4" height="50" width ="150"></a>
24.         <tr>
25.             <a href="URL or path for LINK #8" <img src="/directory
26.             path/GRAPHIC#5" height="50" width ="150"></a>
27.     </table>
28.         <br>
29.             <t3>TEXT HEADER #1 align=left</t3>
30.         <br>
31.     <table width="90%" border=0 cellspacing=10 cellpadding=0 bgcolor="#000000"
32.       align=center>
33.         <tr>
34.             <a href="URL or path for LINK #9" <img src="/directory
35.             path/GRAPHIC#6" height="50" width ="150"></a>
36.         <tr>
37.             <a href="URL or path for LINK #10" <img src="/directory
38.             path/GRAPHIC#7" height="50" width ="150"></a>
39.         <tr>
40.             <a href="URL or path for LINK #11" <img src="/directory
41.             path/GRAPHIC#8" height="50" width ="150"></a>
42.
43.     </table>
44.     </frame>
45.
46.     <frame>
47.
48.     <table>
49.         <tr>
50.             <table width="100%" border=0 cellspacing=15 cellpadding=0
51.             bgcolor="#000000" align=center>
52.           <tr>
53.             <td><a href="URL or path for link#1"> alt="QUOTES"</a>
54.             <td><a href="URL or path for link#2"> alt="HOT PICKS"</a>
55.             <td><a href="URL or path for link#3> alt="CALENDERS"</a>
56.             <td><a href="URL or path for link#4>alt="NEWS"</a>
57.     </table><br>
58.         <br>
59.             <img src="URL for GRAPHIC #9" align=center
60.             border="0" height="80" width="325">
61.     <br><t1>HEADLINE TEXT>/t1>
62.     <table>
63.         <Colgroup span="2">
64.             <Col width = "400" align="center">
65.             <Col width = "200" align="center">
66.         <tr><td>
67.                 <img src="/directory path/GRAPHIC #10" align = center
68.                 border="0" height="180" width="350">
69.         <td>
70.     /* INPUT FOR ACCOUNT NUMBER AND ACCESS CODE */
71.     <SCRIPT LANGUAGE ="Javascript">
72.     <!---
73.             [Javascript variable declarations]
74.             [Javascript functions to enable login] ---!>
75.     </SCRIPT>
76.         <table>
77.             <td>
78.             <img src="/directory path/GRAPHIC #11" align = center>
79.             <table width="150" height="25">
80.             <td>
81.             <font size=-2 face="arial,helvetica,verdana">Account#</font>
82.             <tr><input type=text name="USERID" maxlength=9 size=20>
83.             <tr><font size=-2 face="arial, helvetica">Access Code:</font>
84.             <tr><input type=password name="PASSWORD" maxlength=10 size=20
85.                 onKeyDown="SuppressEnterBell(event)"
86.                 onKeyPress="SuppressEnterBell(event)"
87.                 onKeyUp="SubmitOnEnter(event)">
88.             <br>&nbsp;
```

-continued

```
89.          <br><input type="button" value="Login"
90.          OnClick="ProcessForm( )">&nbsp;&nbsp;<input type="reset">
91.          <br>&nbsp;
92.          </td>
93.          </table>
94.      </table>
95.    <tr>
96.         <img src="/directory path/GRAPHIC #12" border="0
97.         height="200" width="350">
98.    <tr>
99.            <p>TEXT FOR TEXT OBJECT #1</p><br>
100.           <p>TEXT FOR TEXT OBJECT #2</p>
101.     </table>
102.    </frame>
103.  </frameset>
104. </html>
```

Web page documents comprise HTML code that is parsed, interpreted, and rendered by a browser. An HTML document comprises a plurality of HTML "markup" elements (tags) with corresponding attributes, that are used to describe the layout and formatting of various objects, including plain text and graphic objects, embedded between tag pairs. Exemplary elements include text tags (e.g., <b></b> for bolding text), links (e.g., <a href="URL"></a>), formatting (e.g., <p></p> for creating a new paragraph, graphical (e.g., <img src="name">), wherein "name" defines an absolute or relative location at where an image is stored, tables (e.g., <table></table>) creates a table, and forms (e.g., <form></form> creates all forms).

As of Netscape Navigator 3.0 (and other later browsers), web pages could include frames. When using frames, the display page is divided into multiple framed areas. Framing enables a single display page to include source code from several HTML documents (one for each frame) or optionally, enables a single document to include more complicated grouping of contents whereby different content groups are contained in separate frames. Frames are commonly found on the web pages at sites that display a great deal of text and graphical content, such as MSN.com, ESPN.com, and USA-Today.com.

Figure 5:
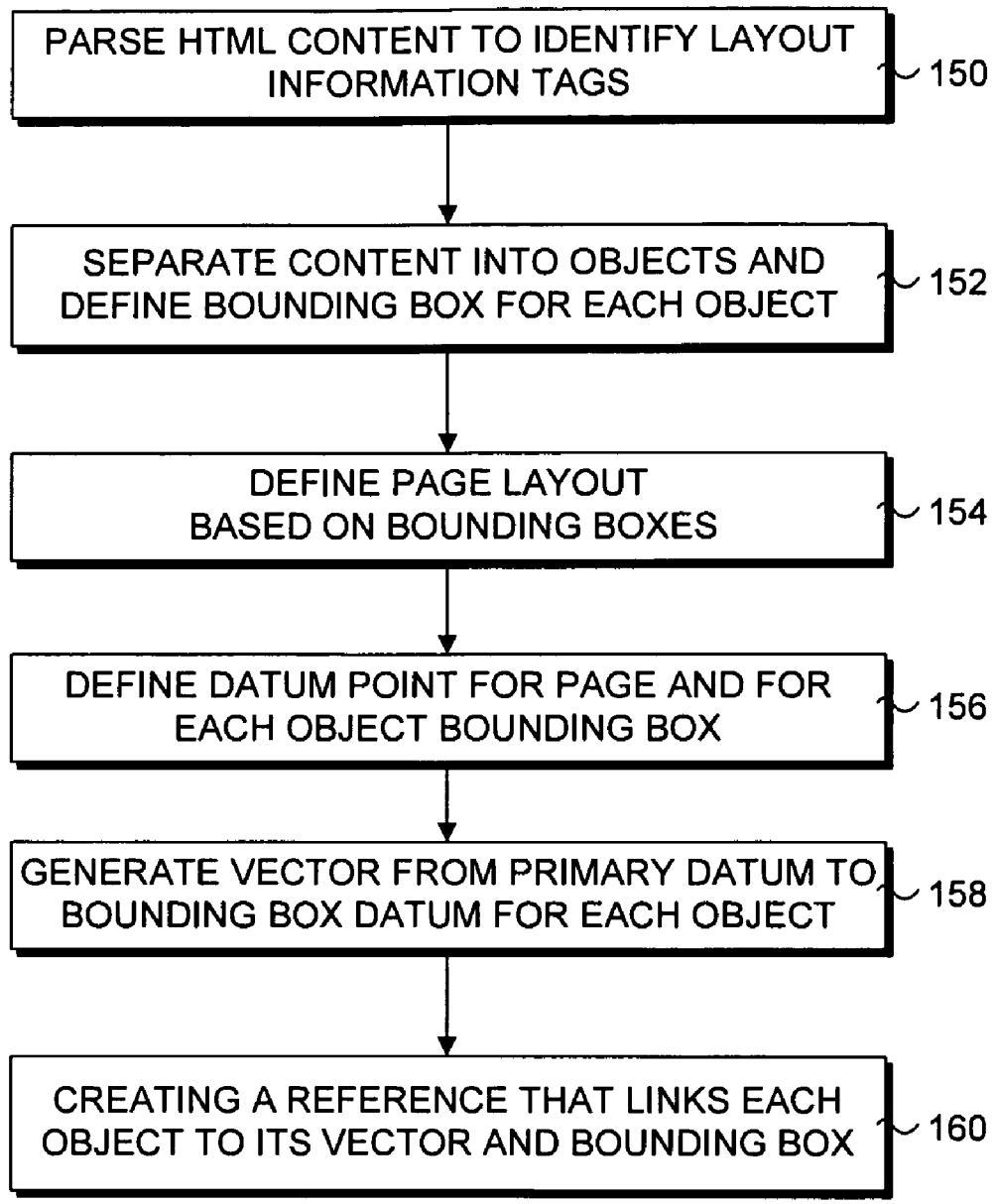
FIG. 5 is a flowchart illustrating the logic used by the invention when translating content into a scalable vector representation of that content.

With reference to the flowchart of FIG. 5, the process for translating the HTML content into a scalable vector representation proceeds as follows. The process is initiated when the proxy server receives the HTML corresponding to the parent document (and frame documents, if appropriate), whereupon a pre-rendering parsing of the HTML is performed to determine where to place the various objects on the display page in a block 150. For example, elements such as tables, column definitions, graphic images, paragraphs and line breaks are identified. If frames are included, each frame is examined in the sequential order it appears in the HTML document, or the order in which the HTML documents corresponding to the frames in a frameset are downloaded to the browser. During further processing, the actual objects are rendered in their respective positions. Some of these objects are rendered almost immediately, such as plain text, while other objects, such as graphic objects, must first be retrieved prior to being fully-rendered. With respect to tables, there are some instances in which all of the objects corresponding to the cells in the table must be retrieved prior to rendering any of the table, while a well-designed table can be rendered incrementally. For example, by using Column grouping, the format of the corresponding table can be quickly determined by the browser. In some instances, one or more bitmaps may actually need to be fetched before the page layout can be determined.

Next, in a block 152, the content is separated into objects based on logical groupings of content portions and a page layout is built using bounding boxes that are produced for each object. As the primary HTML document is parsed, logical groupings of content will emerge. For instance, text content contained within paragraph tags <p></p> forms a logical grouping of text content. In essence, a logical grouping means the content should appear together as a logical group, such as within a substantially rectangular outline, in the rendered page. Other logical groupings include frames, table content, row content, single line entries such as headlines and headers, and user-interface objects, as well as graphic layout objects, such as separator bars, and graphic images. In addition to logically grouping content into objects, a "bounding box" is defined for each object. In general, the bounding box defines an outlined shape within which the content (text or graphic image) will appear. In most instances, the bounding box will be substantially rectangular in shape. However, bounding boxes comprising more complex shapes may also be produced.

In further detail, the following explains how objects corresponding to graphic images are produced. In HTML, objects comprising graphic content are identified by an <img src="/local directory path/graphic image file" (for a local graphic image) or "URL" (for a remote graphic image)> or <object> or other tags. In the foregoing tag, local graphic images are typically stored on the same server as the web page, or another computer that is local to the site's server, and generally are located through a local directory path (absolute or relative to the location of the present page) that points to the graphic image file. Remote images are those images that are stored on servers at sites that are remote to the web server. For example, with reference to LISTING 1, when the parser encounters line 9, the browser identifies that data comprising a graphic image corresponding to logo graphic object 1 will be arriving (or may have already been received), and the displayed image is to have a height of 80 pixels and a width of 100 pixels. The location of each object on a display page will be dependent on previous HTML layout elements, such as tables, paragraphs, line breaks, and other graphic objects. The size and location of the other graphic objects (i.e., graphic objects #2-12) on the page are determined in a similar manner. The HTML code for these objects are shown in lines 16, 19, 22, 25, 34, 37, 40, 59, 67, 78 and 96, respectively. As identified in the HTML code, data corresponding to graphic objects #9 (advertisement banner 46A) is forwarded to the browser from an external site (as indicated by the URL to GRAPHIC #9), while graphic objects 1-8 and 10-12 are sent from the web site the parent HTML document is sent from.

In a similar manner, the foregoing technique is applied to the HTML code in the primary document to identify other types of objects as well. In addition to parsing the primary HTML document, similar processing is performed on referenced documents, such as documents that include frame content that is defined and stored separate from the primary HTML document.

Figure 4A:
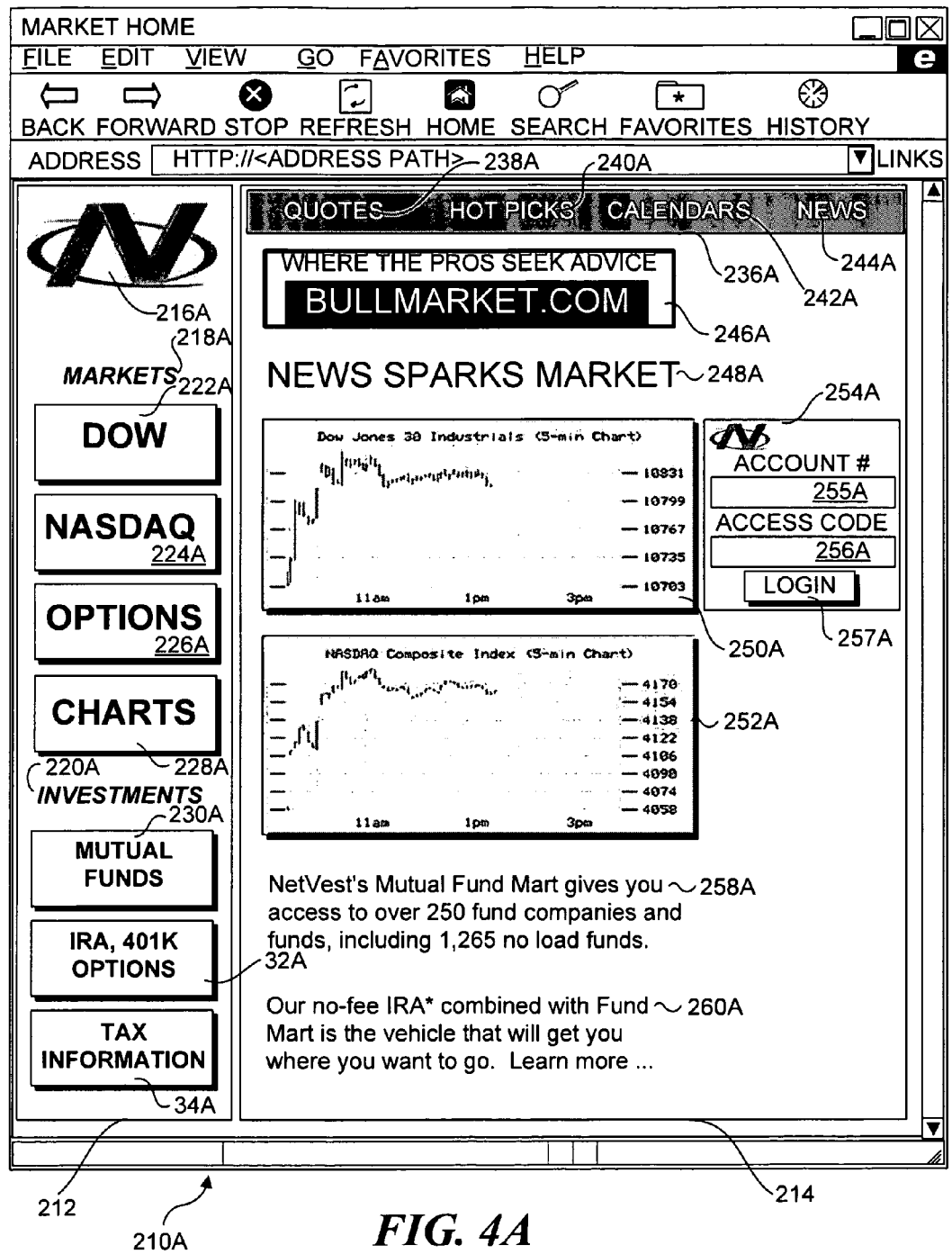
FIG. 4A is a representation of an exemplary web page has displayed on a conventional browser.
Figure 4B:
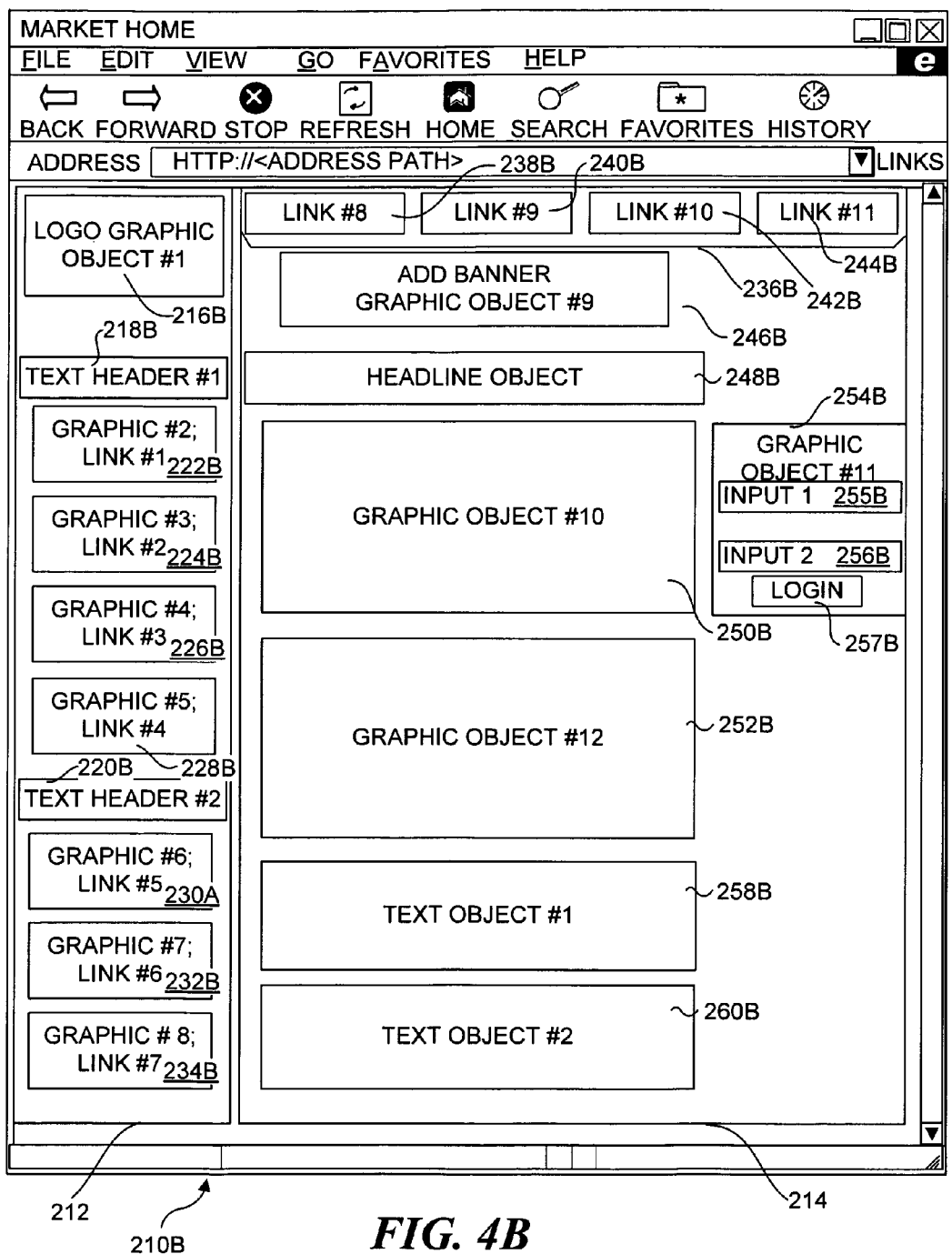
FIG. 4B is a schematic diagram illustrates various objects that are generated based on the HTML code of the web page of FIG. 4A.

A representation of the results of the functions performed in block 152 are shown in FIG. 4B. In the Figure, objects corresponding to the original content of FIG. 4A are shown with an appended "B" that is added to each object's root reference number, wherein the root reference number for an object is that same as the logically grouped content in FIG. 4A that it corresponds to, e.g., an object 248B is generated for "NEWS SPARKS MARKET" headline 248A, etc.

Next, in a block 154, the page layout is defined based on the bounding boxes. In actuality, generation of the page layout information is performed in conjunction with defining the boundary boxes for the objects, wherein the location of a given object is based on the location of other related (e.g., if within a table) or non-related objects corresponding to HTML content that have been previously parsed. For example, the location of a given paragraph will depend on the other content for the page that are listed prior to the definition for the paragraph in the primary HTML document or referenced document, if applicable. As the HTML content of the primary and any referenced HTML documents are parsed, the page layout is generated based on the various HTML tags and the content embedded between tag pairs and/or referenced by a tag pair statement (e.g., graphic images).

As will be recognized by those skilled in the art, the functions performed in blocks 150, 152, and 154 are commonly performed by conventional browsers during a pre-rendering process. In some browsers, these functions are performed by the Mozilla rendering engine, which comprises open source software that is readily available for use by developers. At present, the software for the Mozilla rendering engine may be accessed via the Internet at www.mozilla.org. Accordingly, in one embodiment, the present invention uses core functionality provided by the Mozilla rendering engine source code to perform the functions of block 150, 152, and 154.

Figure 4C:
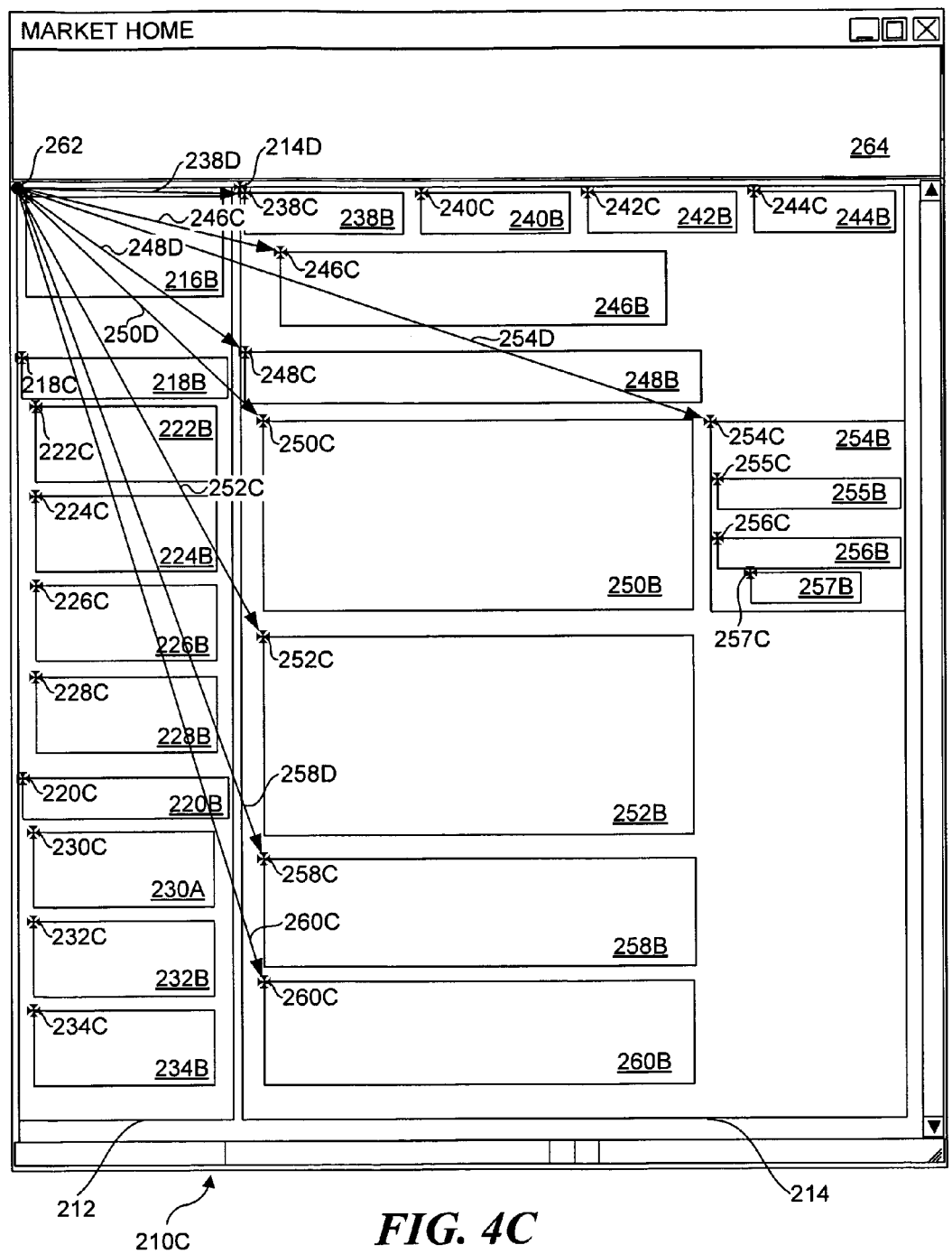
FIG. 4C is a schematic diagram illustrating a set of vectors and bounding boxes corresponding to the objects generated in FIG. 4B.

At this point, the present invention deviates substantially from the prior art by using the various object layout data generated during the pre-rendering process to generate a scalable vector representation of the original page content. First, in a block 156, a datum point is defined for the page and the bounding box for each object. For example, as shown in FIG. 4C, a rendered page datum 262 is defined to be coincident with the upper left hand corner of the display frame of the rendered page for the web page. Generally, any point on the page may be used as the page datum—the only requirement is that the page datum that is selected is used consistently throughout the process. The use of the upper left hand corner of the display frame is advantageous since the location of the first object encountered in the HTML code for a page is located relative to this corner.

In general, the datum points for each object may also be located any place on the object, as long as the object datum points are used in a predictable manner. For example, as depicted in FIG. 4C, various datum points for corresponding objects are defined to be coincident with the upper left hand corner of the bounding box for that object, wherein the object's datum point shares the root reference number of the object with an appended "C."

Figure 4D:
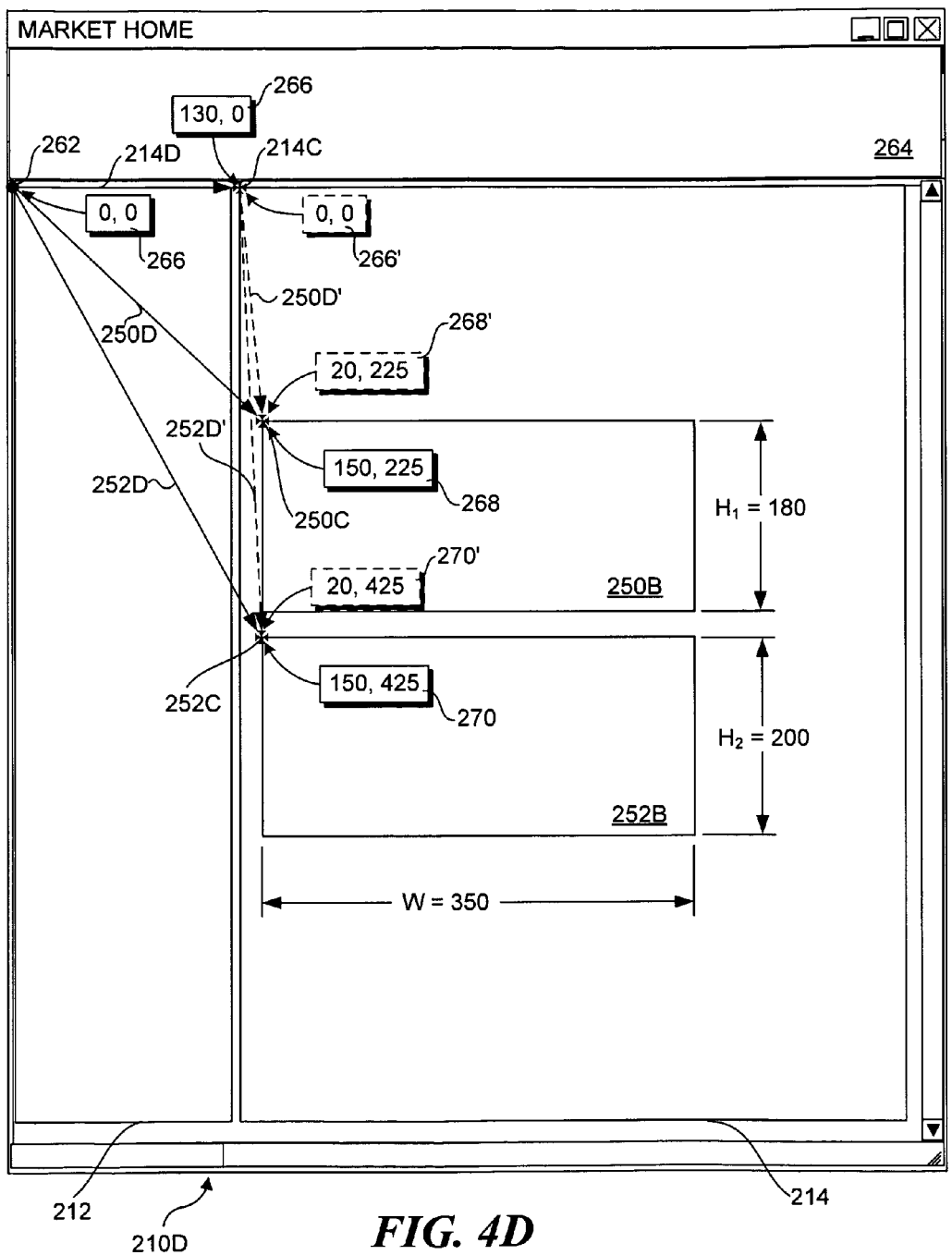
FIG. 4D is a schematic diagram illustrating how various vectors and bounding boxes may be defined in accordance with the invention.

Once the page's datum point and an object's datum point are known, a vector between these points is generated for each object in a block 158. With reference to FIG. 4D, in one embodiment, wherein the page datum point corresponds to the upper left and corner of the display frame and is assigned an XY value 266 of 0,0, the vector for a given object may be stored as the XY value of the datum point of that object relative to 0,0, such as a value of 150, 225 (ref. num. 268) for a vector 250D pointing to an object datum 250C, and a value of 150, 425 (ref. num. 270) for a vector 252D pointing to an object datum 252C. In another embodiment, each vector may be stored as XY data relative to a 0,0 datum point corresponding to the upper left hand corner of the frame the object belongs to. For example, a vector 250D' from a frame datum 214D to object datum 250C is stored as 20, 200 (ref. num. 268'), while a vector 252D from frame datum 214D to object datum 252C is stored as 20, 425. In this embodiment, offset information for each frame relative to a known datum will also be stored, as depicted by a vector 214D.

The scalable vector representation is completed in a block 160, wherein a reference is created for each object that includes or links an object's content and attributes, such as object type (e.g., text, image), object typeface, and boundary box parameters, to the object's vector. For example, object 250B is a graphic image having a vector 250D and a bounding box that is 180 pixels high and 350 pixels wide, while object 252B is a graphic image having a vector 252D and a bounding box that includes a height of 200 pixels and a width of 350 pixels. This enables client-side operations to be performed that only initially consider the vectors, wherein if it is determined that a vector's endpoint (and/or the bounding box corresponding to the object the vector points to) would appear off of a display, there is no need to retrieve the content and attribute data linked to the vector. This concept is explained in further detail in the following section.

It is noted that a portion of the display content produced on a client device will never contain any rendered content, as this portion is reserved for the browser's user interface. In WINDOWS™ environments, this portion will include the browser's window frame, as well as the pulldown and icon menus provided in the browser's user interface, which are depicted by a box 264 in the Figures herein.

Client-Side Software and Processing

As discussed above, the present invention supports a wide variety of clients, including land-based clients and wireless clients. Each client requires some client-side software that enables the scalable vector content data provided to it to be rendered at a user-selectable scale factor and offset on the client's display, such as a monitor or built-in LCD screen.

By enabling original content from a web site to be displaced in such a resolution-independent manner, users will be able to view content in a manner that did not previously exist, greatly enhancing the user experience. For example, in some implementations the client may be a personal computer (PC). Using a least-common denominator approach, many web pages are designed for a smaller resolution (for example 640×480 pixels, a minimum resolution commonly supported by nearly all PC's, including legacy PC's) than the resolution provided by the video output capabilities available with many of today's PC's, such as 1024×768 pixels, 1280×1024 pixels, and even 1600×1200 pixels. As a result, when these web pages are displayed on a high-resolution display, they occupy only a portion of the display, making portions of the pages, especially those portions containing small text, difficult to read. By enabling users to selectively magnify the entire page, these design flaws are easily overcome. Alternatively, the client may be a small device, such as a hand held computer or a cell phone, which has a smaller display resolution than common Web pages are designed for. As explained below, through use of the invention's scalable vector representation and client-side processing, users are enabled to view the entire content of billions of existing Web pages using handheld devices in a simple and reasonable way.

In one embodiment, the client software may be a plug-in to a Web browser, such as Netscape Navigator or Microsoft Internet Explorer. Such a plug-in might have the browser download the data and display it in a sub-window of the browser. Alternatively, the client software may be a Java applet running in a browser. As another option, the client software may be a stand-alone program that interfaces with the proxy server or proxy software directly. The client software may bypass the proxy when requesting information that won't be translated to vectors, such as bitmaps.

Figure 4E:
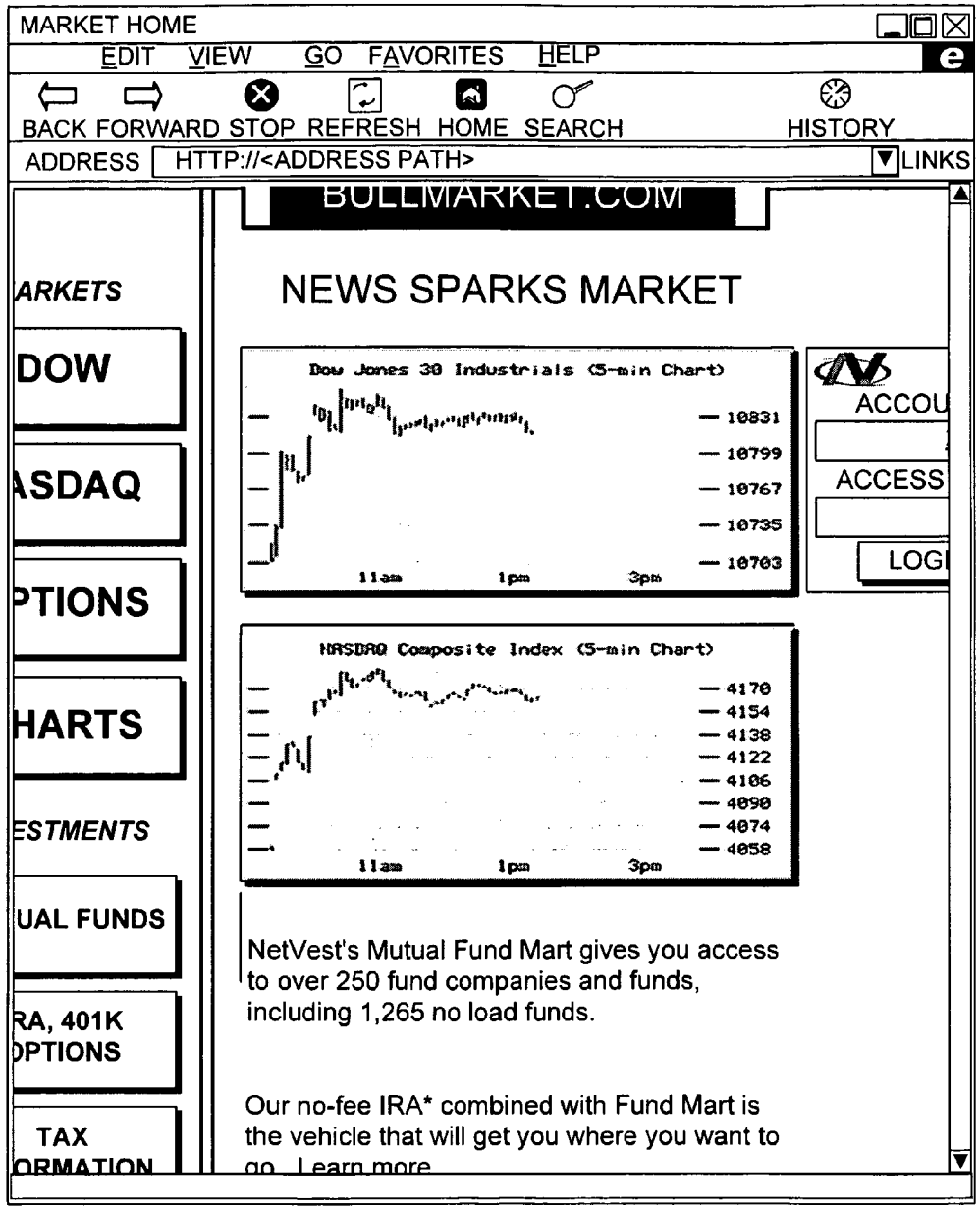
FIG. 4E is a representation of the web page of FIG. 4A after it has been offset and scaled in accordance with the invention.
Figure 6:
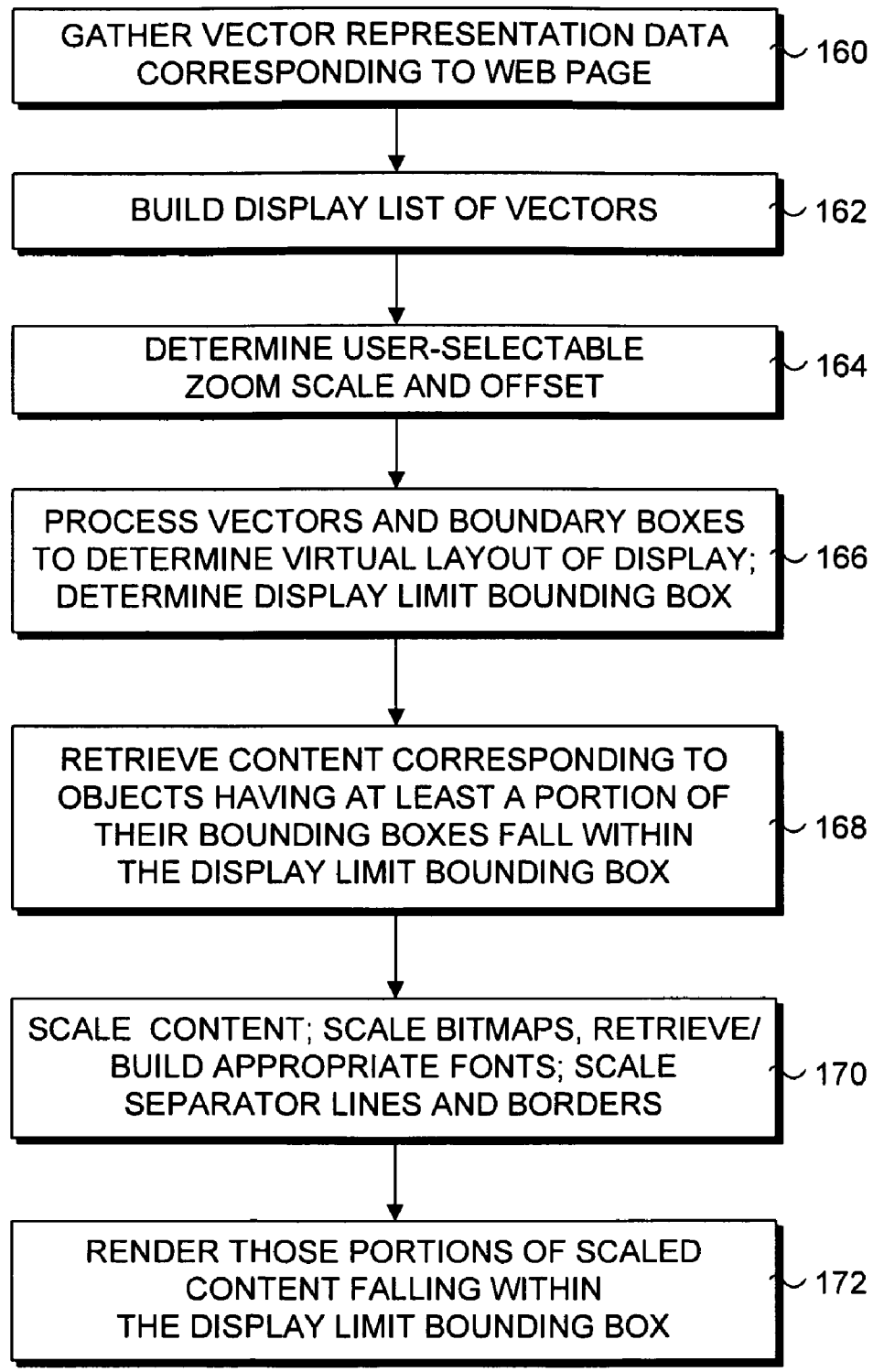
FIG. 6 is a flowchart illustrating client-side operations that are performed to create a rendered display page based on the translated content the client receives and user-input.

With reference to FIG. 6, client-side processing proceeds in the following manner. In a block 160, the vector representation data (i.e., vectorized HTML content and compressed bitmap content) for the web page is gathered at the client. Typically, this data will be stored in a cache at the client as it is being received, and the client simply retrieved the data from the cache. In a block 162, a display list of vectors is built. This process is well known in the CAD arts, and is enabling rapid zooming of vector-based objects. In a block 164, user selectable scale and offset (pan) values are determined. Based on various user interactions with the user-interface of the client, the user is enabled to control the zoom (size) and offset of the rendered page. For example, suppose the user provides zoom and offset inputs to produce a rendered page 210E, as shown in FIG. 4E. In this rendered page, the original origin is now off of the screen (the page image is shifted upward and toward the left—see FIG. 4F), and the view has been scaled approximately 1.3 times.

Figure 4F:
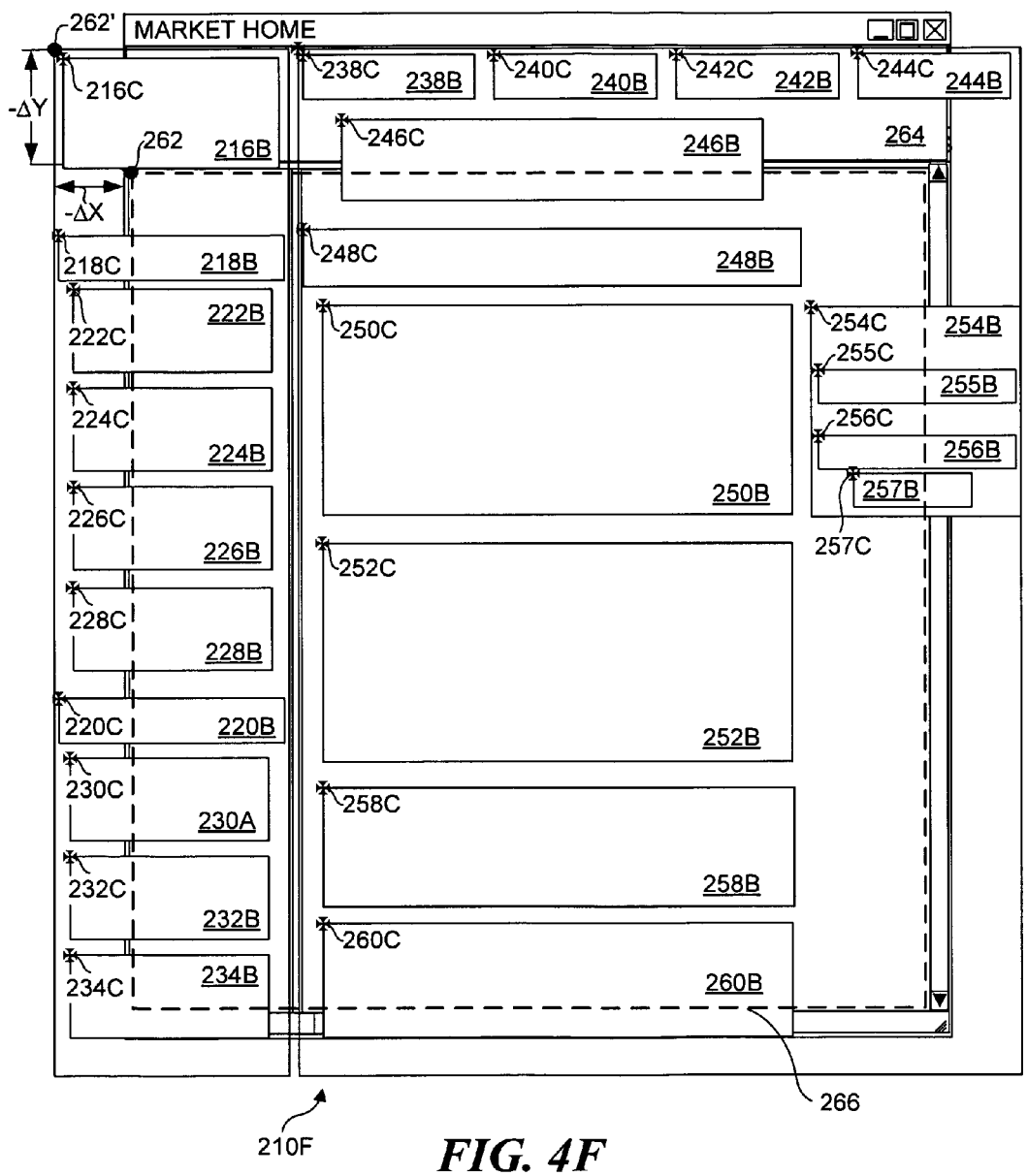
FIG. 4F is a schematic diagram illustrating new datum points and bounding boxes corresponding to the scaled and offset web page.
Figure 4G:
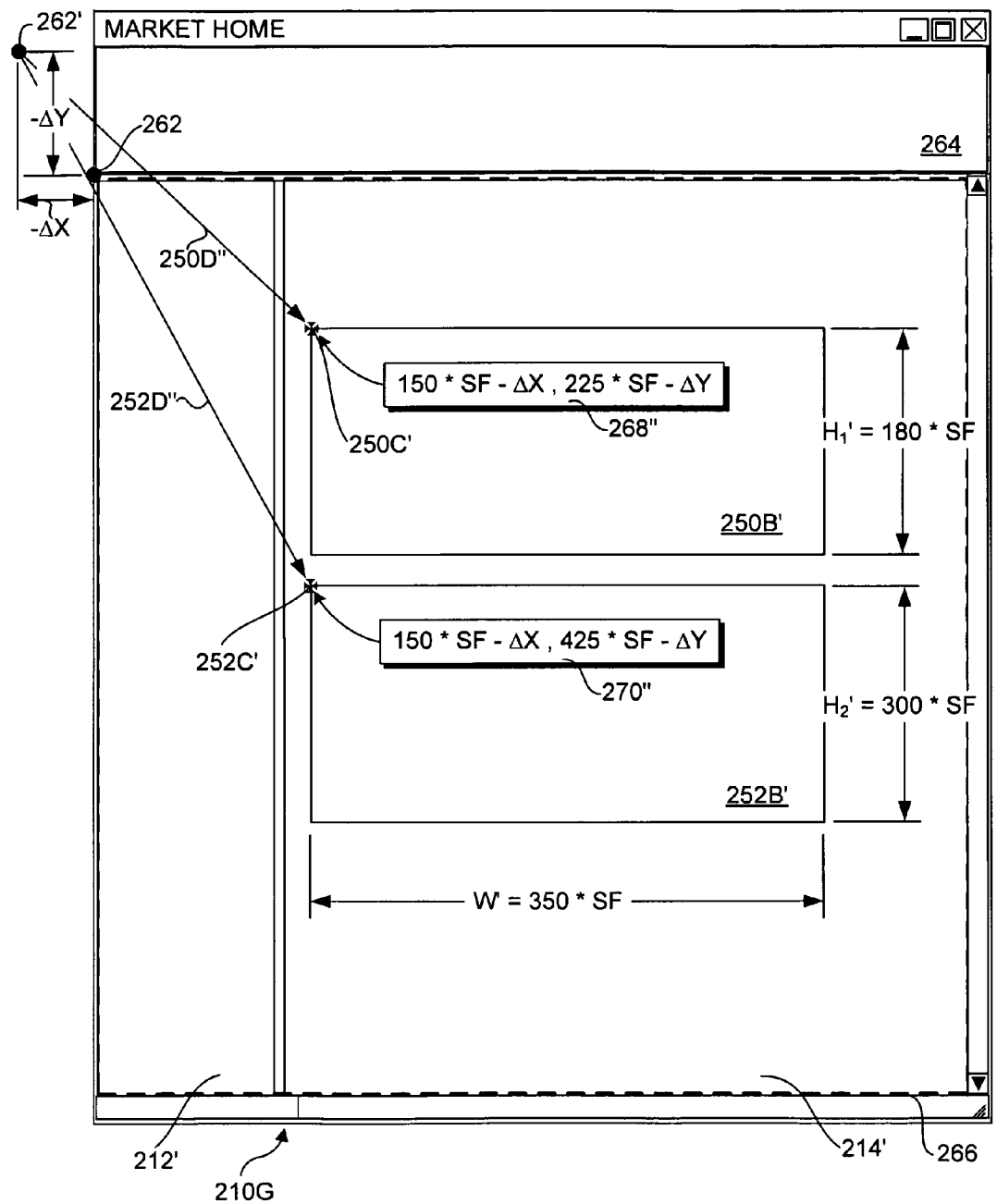
FIG. 4G is a schematic diagram illustrating new vectors and bounding box parameters for a pair of objects in the scaled and offset web page.

Next, in a block 166, the vectors and boundary boxes are processed based on the scale and offset, and a bounding box defining the limits of the display content is determined. The results of this step are shown in FIG. 4F, while FIG. 4G shows specific details one how the vectors and bounding boxes corresponding to image objects 250B and 250B (now 250B' and 252B', respectively) are processed. Logically, there are generally two ways to scale and offset the rendered content. In one embodiment, vectors and bounding boxes are mapped to a virtual display area in memory that has much greater resolution (e.g., 100,000×100,000 pixels) than any real display, and a virtual display limit bounding box is scaled and moved around over the virtual display area. Accordingly, during subsequent processing described below, objects falling within the display bounding box are rendered by reducing the scaling of those objects in the virtual display to how the objects will appear on the client device display relative to the virtual display bounding box. In the alternate, a fixed reference frame corresponding to the display resolution of the client device screen is maintained, wherein all vectors and bounding boxes are scaled and offset relative to the fixed reference frame. Each scheme has its advantages and disadvantages. One advantage of the second method is that the display bounding box is always maintained to have a size that matches the resolution of the content display area on the client device.

As shown in FIG. 4G, respective offsets in X and Y, ($-\Delta X$ and $-\Delta Y$ in the Figure) are applied to the starting point of each of the vectors. The vectors are then scaled by a scale factor "SF." The results of the new vectors are depicted by vectors 250D" and 252D". This produces a new datum for each object's bounding box that is relative to rendered page datum 262, which remains fixed. As discussed above, only a portion of the display screen will actually be used to display content (as defined by a display limit bounding box 266 in this embodiment), while other portions of the screen, including box 264, will comprise a generally fixed-size user interface. Accordingly, rendered page datum 262 is not located at the upper left hand corner of the display area, although it possibly could be located at this point when either the current user interface is inactive (i.e., the display portion of the user interface is temporary disabled) or the user interface is contained in other portions of the display.

This foregoing process establishes a starting point (the new datum) for where the content in each object's bounding box will be rendered. At this point, each object's bounding box is then drawn from its new datum using the scaling factor. For example, in the original web page 210D (FIG. 4D), bounding box 250B had an X-axes datum of 150 pixels, a Y-axis datum of 225 pixels, and a height and width of 180×350 pixels. In contrast, after being offset and scaled, bounding box 250B' has an X-axis datum of $150*$ SF$-\Delta X$, a Y-axis datum of $225*$SF$-\Delta Y$, and a height and width of $180*$SF$\times 350*$SF.

Returning to the flowchart of FIG. 6, once the vectors and bounding boxes are offset and scaled, content corresponding to objects having at least a portion of their bounding boxes falling within the display limit bounding box is retrieved from the client device's display list in a block 168. For examples, as shown in FIG. 4F, content corresponding to all of the objects except for those falling entirely outside of display limit bounding box 266 (objects 216, 238, 240, 242 and 244) is retrieved from the display list. That content is then scaled in a block 170. For image content, this comprises decompressing and scaling the compressed bitmaps corresponding to those images. For text content, this comprises scaling the font (i.e., typeface) that the text content portions of the web page are written in the parent HTML document and any referenced documents. There are various techniques for typeface scaling that may be implemented here, depending on the available resources provided by the operating system of the client device. For example, for WINDOWS™ operating systems, many TRUETYPE™ fonts are available, which use a common scalable definition for each font, enabling those fonts to be scaled to just about any size. In other cases, such as current PDA (e.g., Palm Pilots) operating systems, there is no existing feature that supports scaling fonts. As a result, bitmapped fonts of different font sizes and styles may be used. In addition to scaling image and text content, other types of content, such as separator lines and borders may also be scaled by block 170.

The process is completed in a block 172, wherein those portions of the scaled content falling within the display limit bounding box are rendered on the client device's display.

Figure 7A:
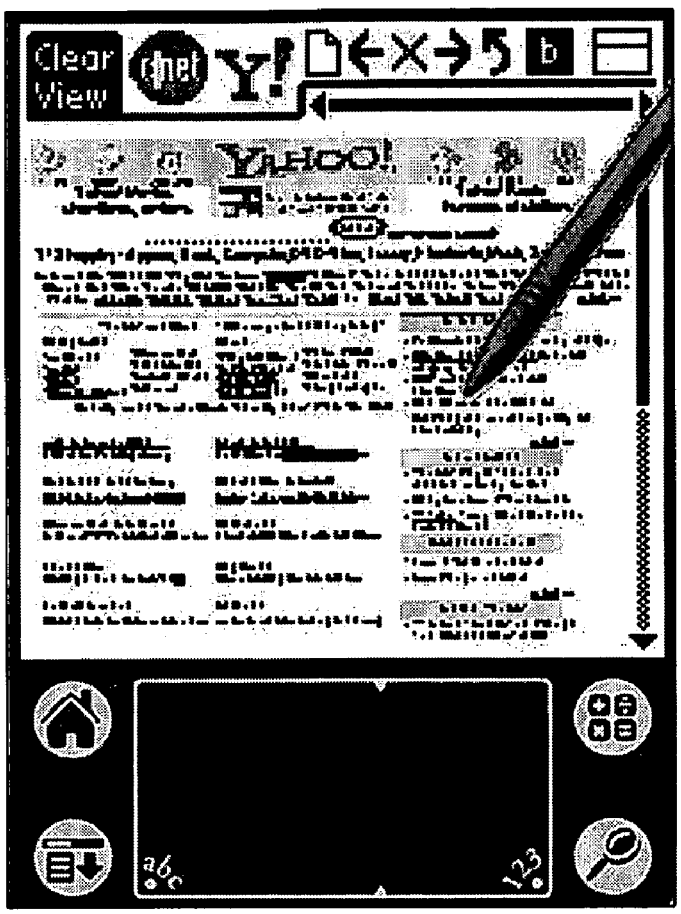
FIGS. 7A and 7B are representations of a nominal and a zoomed in column view of an exemplary web page as they might appear on a Palm device.
Figure 7A:
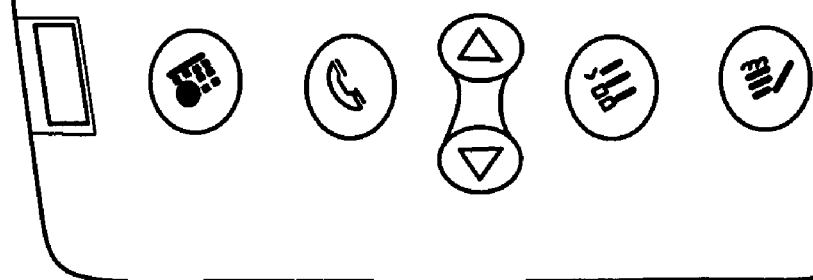
Figure 7B:
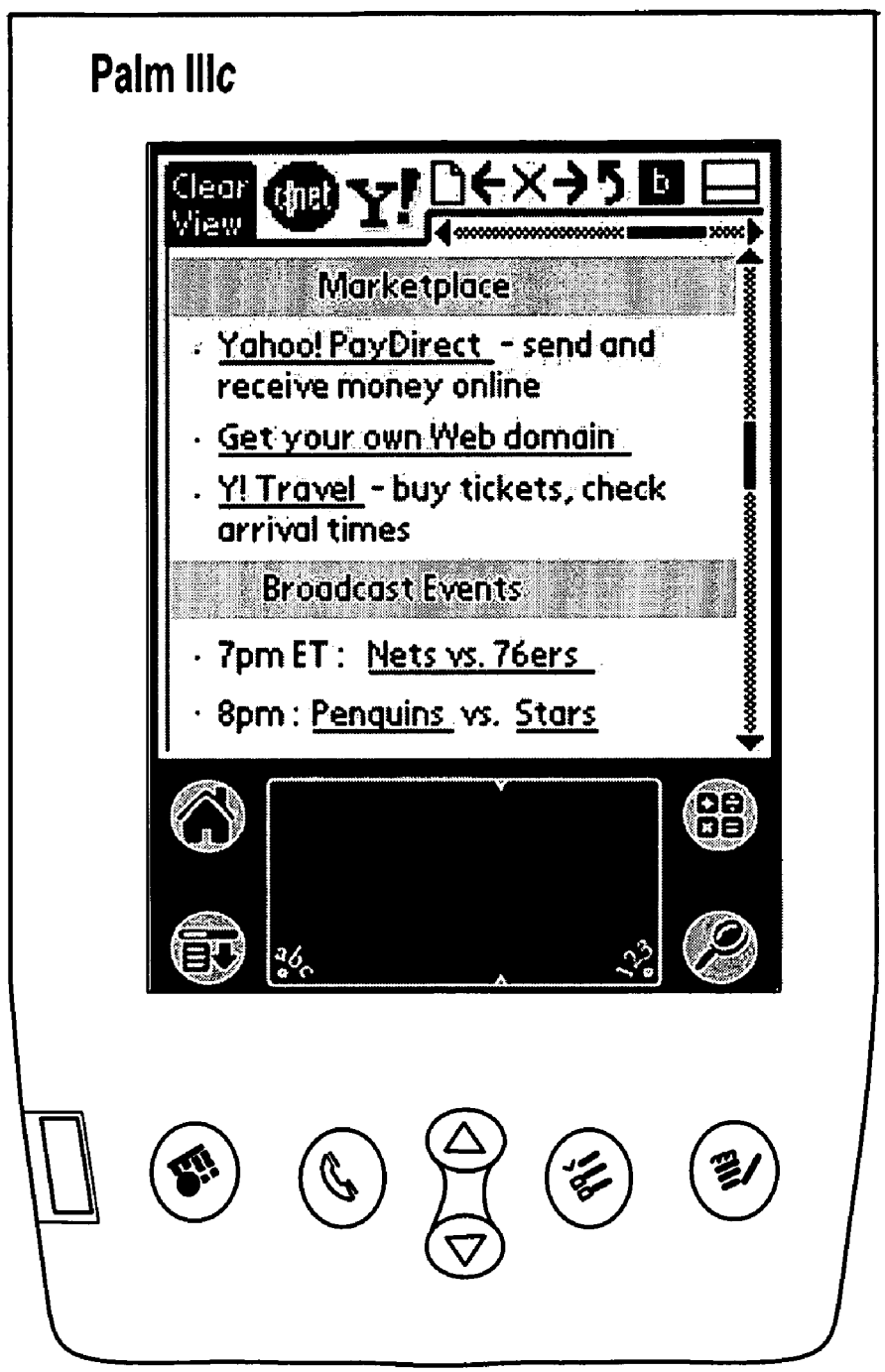

As discussed above, it is foreseen that the invention will be used with client devices having small, low resolution displays, such as PDAs and pocket PCs. Examples of various views of an exemplary web pages obtained from the YAHOO™ web site are shown in FIGS. 7A-B, 8A-B and 9A-B. For instance, FIG. 7A represents how the YAHOO™ home page might appear on a Palm IIIc color PDA.

Figure 8B:
Figure 9A:
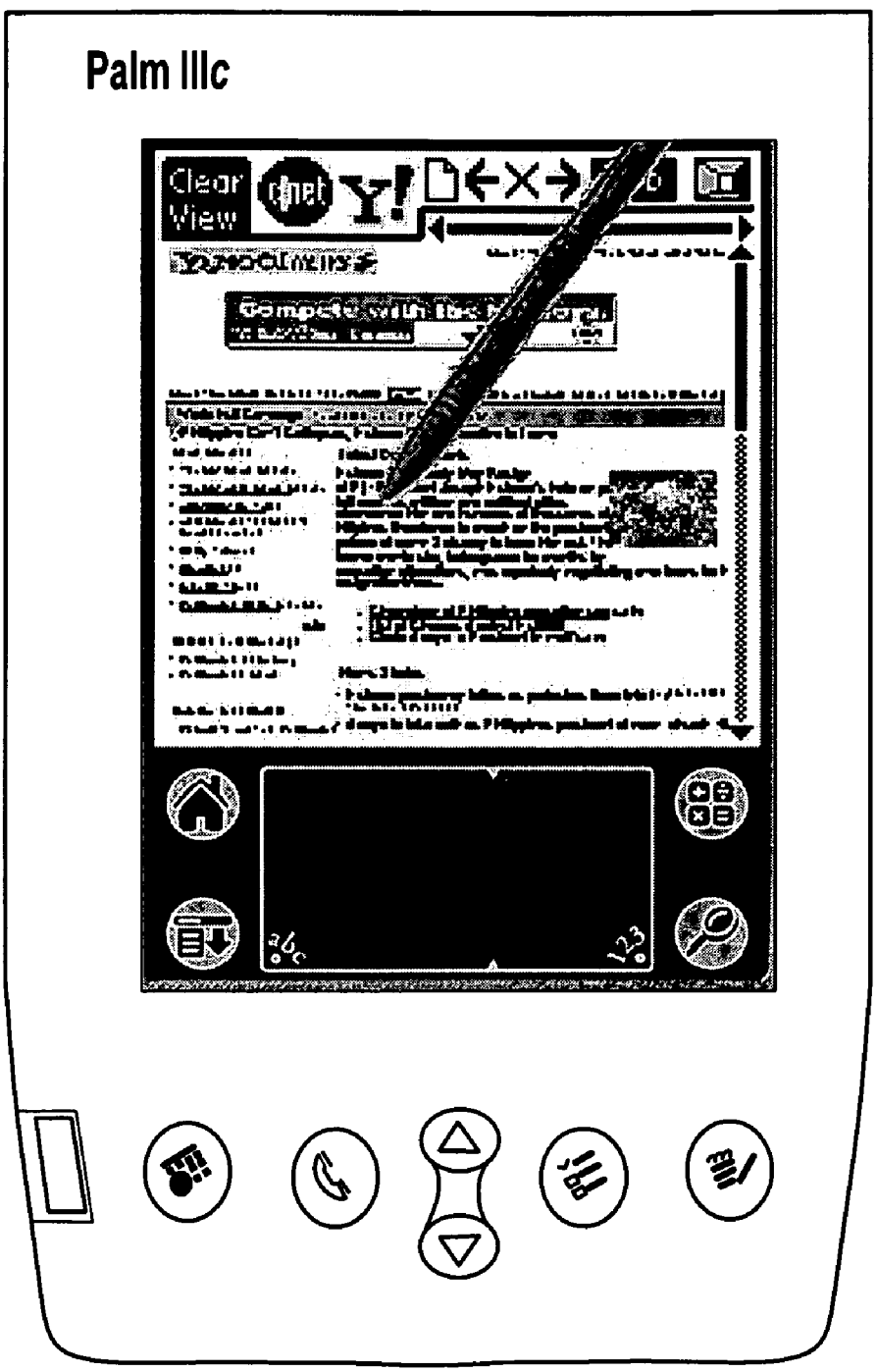
FIGS. 9A and 9B are representations of a nominal and zoomed in view of a text portion of a web page as they might appear on the Palm device.
Figure 9B:
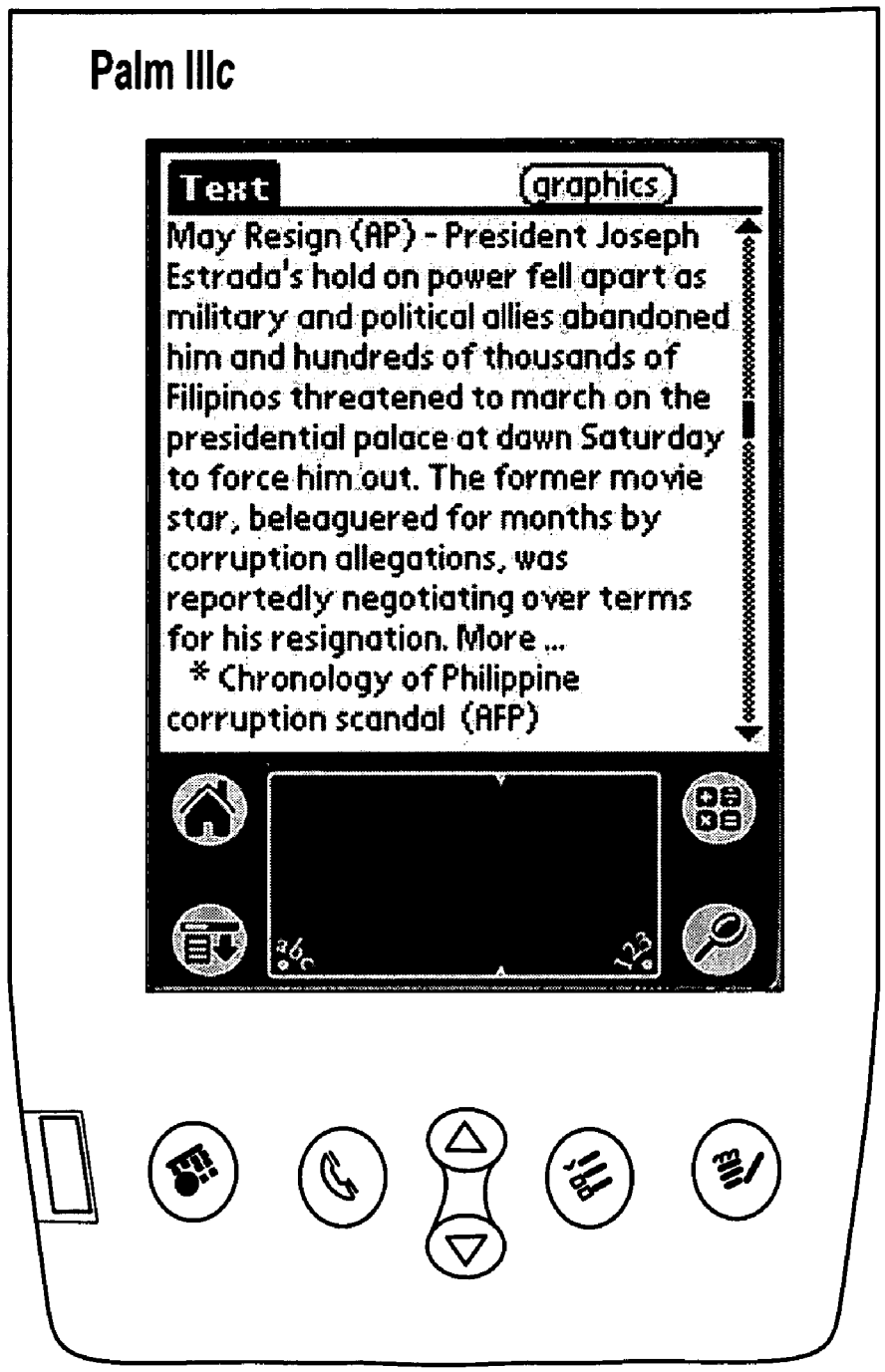

In addition to directly scaling and offsetting content, the client user-interface software for PDA's provides additional functionality. For instance, a user may select to view a column (results represented in FIG. 7B by tapping that column with a stylus, a shown in FIG. 7A. Similarly, the user may select to zoom in on an image by tapping the image with the stylus, as shown in FIGS. 8A and 8B, or select to view a paragraph in an article by tapping on the paragraph, as shown in FIGS. 9A and 9B. It is noted that in some instances, the display of the paragraph may be reformatted to fit the characteristics of the display, rather than following the original format in the zoom-out view.

It is further noted that that different scaling factors can be applied to the X and Y axis so as to change the aspect ratio of the display. For example, a Web page may be designed to be displayed on a computer having a resolution of 800×600 pixels, or a 4X to 3Y aspect ratio. In this case, the display corresponds to a "landscape" layout, wherein there are more pixels along the X axis than along the Y axis. Conversely, many handheld devices display images having a "portrait" layout, wherein there are more pixels along the Y axis than the X axis. By enabling different scaling factors to be applied to the X and Y axes, the present invention enables the aspect ratio of a rendered display image to be adjusted to better fit the aspect ratio of the client device.

An Exemplary Computer Architecture

Figure 10:
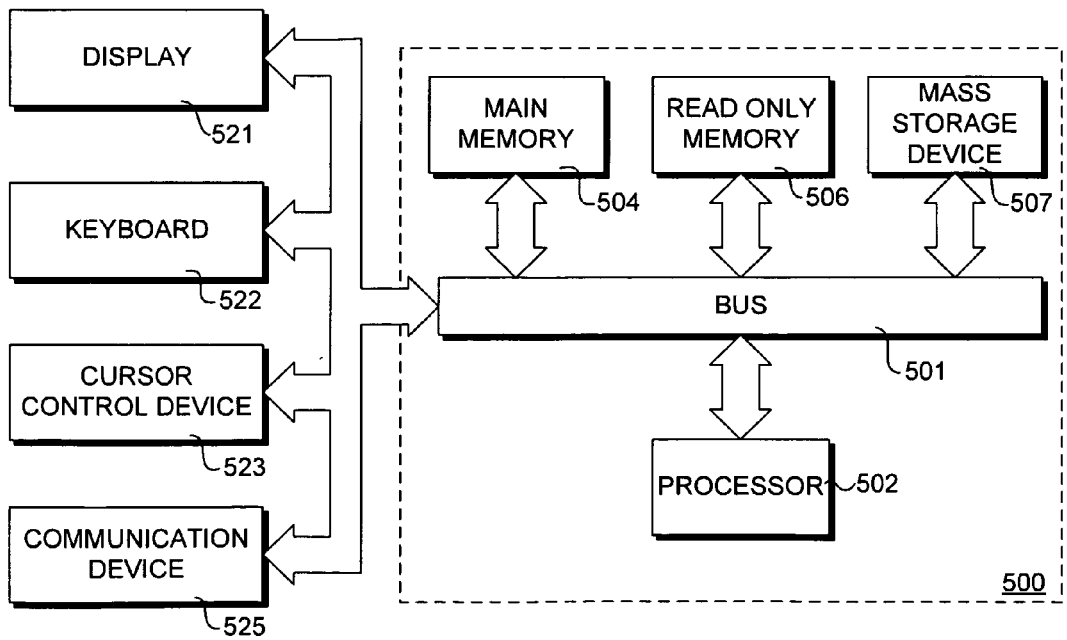
FIG. 10 illustrates an exemplary computer system that may be used for implementing various aspects of embodiments of the invention.

An exemplary machine in the form of a computer system 500 in which features of the present invention may be implemented will now be described with reference to FIG. 10. Computer system 500 may represent a workstation, host, server, print server, or printer controller. Computer system 500 comprises a bus or other communication means 501 for communicating information, and a processing means such as processor 502 coupled with bus 501 for processing information. Computer system 500 further comprises a random access memory (RAM) or other dynamic storage device 504 (referred to as main memory), coupled to bus 501 for storing information and instructions to be executed by processor 502. Main memory 504 also may be used for storing temporary variables or other intermediate information during execution of instructions by processor 502. Computer system 500 also comprises a read only memory (ROM) and/or other static storage device 506 coupled to bus 501 for storing static information and instructions for processor 502.

A data storage device 507 such as a magnetic disk or optical disc and its corresponding drive may also be coupled to bus 501 for storing information and instructions. Computer system 500 can also be coupled via bus 501 to a display device 521, such as a cathode ray tube (CRT) or Liquid Crystal Display (LCD), for displaying information to an end user. Typically, an alphanumeric input device 522, including alphanumeric and other keys, may be coupled to bus 501 for communicating information and/or command selections to processor 502. Another type of user input device is cursor control 523, such as a mouse, a trackball, or cursor direction keys for communicating direction information and command selections to processor 502 and for controlling cursor movement on display 521.

A communication device 525 is also coupled to bus 501. Depending upon the particular presentation environment implementation, the communication device 525 may include a modem, a network interface card, or other well-known interface devices, such as those used for coupling to Ethernet, token ring, or other types of physical attachment for purposes of providing a communication link to support a local or wide area network, for example. In any event, in this manner, the computer system 500 may be coupled to a number of clients and/or servers via a conventional network infrastructure, such as a company's Intranet and/or the Internet, for example.

Importantly, the present invention is not limited to having all of the routines located on the same computer system. Rather, individual objects, program elements, or portions thereof may be spread over a distributed network of computer systems. Additionally, it is appreciated that a lesser or more equipped computer system than the example described above may be desirable for certain implementations. Therefore, the configuration of computer system 500 will vary from implementation to implementation depending upon numerous factors, such as price constraints, performance requirements, and/or other circumstances. For example, according to one embodiment of the present invention, a cell phone or a hand held computer may comprise only a processor or a micro controller and a memory, such as a micro code ROM or RAM, for storing static or dynamically loaded instructions and/or data.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A wireless device, comprising:
    processing means;
    wireless communications means, to facilitate wireless communication with a network that supports access to the Internet;
    a display;
    memory; and
    storage means, in which a plurality of instructions are stored that when executed by the processing means enable the wireless device to perform operations including,
       rendering a browser interface via which a user is enabled to request access to an original Web page, the Web page comprising HTML-based Web content having an original format defining an original width and height of the Web page and an original page layout, functionality, and design of content on the Web page;
       in response to a user request to access the Web page,
          retrieving the Web page via the wireless communication means, and translating at least a portion of the HTML-based Web content from its original format into scalable content that supports a scalable resolution-independent representation of the Web page that preserves the original page layout, functionality and design of the content defined by its original format when scaled and rendered; and
          scaling the scalable content to render the Web page on the display such that a width of the Web page is rendered to fit across the display.

2. The wireless device of claim 1, wherein execution of the instructions performs further operations comprising enabling the user to zoom in on a user-selectable portion of a display of the Web page in response to a corresponding user interface input.

3. The wireless device of claim 2, wherein the display of the Web page is re-rendered in real-time to effect zooming operations.

4. The wireless device of claim 1, wherein the Web page includes at least one hyperlink, and wherein execution of the instructions performs further operations comprising:
    enabling the user to select the hyperlink; and, in response thereto,
       retrieving and translating Web content associated with the hyperlink to produce additional scalable content; and
       employing the additional scalable content to render the Web content associated with the hyperlink on the display.

5. The wireless device of claim 1, wherein execution of the instructions performs further operations comprising:
    parsing markup language code to determine the original page layout of display content within the Web page, wherein the original page layout defines a layout location for a plurality of objects, including at least one of text objects, graphic layout objects, or graphic image objects included in the Web page;

defining a primary datum corresponding to the original page layout; and, for each object, defining an object datum corresponding to the layout location for the object;

generating a vector from the primary datum to the object datum for the object; and creating a reference that links the object to the vector that is generated.

6. The wireless device of claim 1, wherein execution of the instructions performs further operations comprising enabling the Web page to be displayed at different resolutions by scaling the scalable content to re-render the display in response to associated user inputs, wherein the original page layout, functionality, and design of the Web page content are preserved at each of the different resolutions.

7. The wireless device of claim 1, wherein execution of the instructions performs further operations comprising returning the display of the Web page to a previous view in response to a corresponding user input.

8. The wireless device of claim 1, wherein execution of the instructions performs further operations comprising enabling a user to pan a view of the Web page in response to a corresponding user input.

9. The wireless device of claim 8, wherein execution of the instructions performs further operations comprising enabling the view of the Web page to be panned in real-time.

10. The wireless device of claim 1, wherein the page layout of the Web page is defined to have an original aspect ratio, and wherein the scalable content is scaled when rendered so as to produce a display of the Web page having a different aspect ratio.

11. The wireless device of claim 1, wherein execution of the instructions performs further operations comprising enabling a user to zoom on a column of the Web page via a corresponding user input, wherein in response thereto, the display is re-rendered such that content corresponding to the selected column is enlarged.

12. The wireless device of claim 11, wherein the content of the column is reformatted to fit characteristics of the display when the display is re-rendered.

13. The wireless device of claim 11, wherein the corresponding user input comprises tapping on the column via the display.

14. The wireless device of claim 11, wherein the display is re-rendered such that content corresponding to the selected column is rendered to fit across the display.

15. The wireless device of claim 1, wherein the Web content includes at least one image, and wherein execution of the instructions performs further operations comprising enabling a user to zoom on an image via a corresponding user input, wherein in response thereto, the display is re-rendered such that the image is enlarged.

16. The wireless device of claim 15, wherein the corresponding user input comprises tapping on the image via the display.

17. The wireless device of claim 15, wherein the display is re-rendered such that the image is rendered to fit across the display.

18. The wireless device of claim 1, wherein execution of the instructions performs further operations comprising enabling a user to zoom on a paragraph of the Web content via a corresponding user input, wherein in response thereto, the display is re-rendered such that content corresponding to the selected paragraph is enlarged.

19. The wireless device of claim 18, wherein the content of the paragraph is reformatted to fit characteristics of the display when the display is re-rendered.

20. The wireless device of claim 18, wherein the corresponding user input comprises tapping on the paragraph via the display.

21. The wireless device of claim 18, wherein the display is re-rendered such that content corresponding to the selected paragraph is rendered to fit across the display.

22. The wireless device of claim 1, wherein the Web page includes text, layout attributes, and images, and wherein execution of the instructions performs further operations comprising:

receiving content corresponding to the text and layout attributes via a first connection; and receiving content corresponding to at least one image via a second connection.

23. The wireless device of claim 1, wherein execution of the instructions performs further operations comprising:

generating a vector-based display list associated with the scalable content; and employing the display list to re-render the display at different scale factors to zoom the Web page.

24. The wireless device of claim 1, wherein execution of the instructions performs further operations comprising:

parsing markup language code corresponding to the retrieved Web page to determine the original page layout of the content on the Web page;

logically grouping selected content into objects;

defining a primary datum corresponding to the original page layout; and, for each object, defining an object datum corresponding to a layout location datum for the object's associated display content;

generating a vector from the primary datum to the object datum for the object; and creating a reference that links the object to the vector that is generated.

25. The wireless device of claim 24, wherein execution of the instructions performs further operations comprising:

generating a bounding box for each object, the bounding box representing a portion of a rendered display page occupied by the object's associated group of content.

26. The wireless device of claim 25, wherein execution of the instructions performs further operations comprising:

mapping the object vectors and associated bounding boxes to a virtual display in memory.

27. The wireless device of claim 26, wherein execution of the instructions performs further operations comprising:

enabling a user to view the Web page at a user-selectable zoom level and panned view by, determining a first scale factor and offset in response to one or more corresponding user inputs defining a user-selectable zoom level and panned view corresponding to a rendered display of the Web page desired by a user; and determining a virtual display bounding box for the virtual display associated with the first scale factor and offset;

identifying object bounding boxes having at least a portion falling within the virtual display bounding box; and, for each of such object bounding boxes, retrieving content associated with that object bounding box;

applying an appropriate scale factor to the content associated with that object bounding box to produce scaled content; and rendering the portion of scaled content within the virtual display bounding box to render the content on the display.

28. The wireless device of claim 1, wherein the scalable content includes scalable text content, and wherein execution of the instructions performs further operations comprising scaling a scalable font to render the scalable text content.

29. The wireless device of claim 1, wherein at least a portion of the instructions comprise Java-based instructions.

30. The wireless device of claim 1, wherein the device comprises a mobile phone.

31. The wireless device of claim 1, wherein the device comprises one of a Personal Digital Assistant (PDA) or hand-held computer.

32. The wireless device of claim 1, wherein the network comprises a mobile service provider network.

33. The wireless device of claim 1, wherein a portion of the scalable content comprises vector-based content.

34. The wireless device of claim 1, wherein the device comprises one of a desktop computer, notebook computer or laptop computer.

35. The wireless device of claim 1, wherein the device enables a user to browse, zoom, and pan billions of Web pages in a manner that preserves the original layout, functionality, and design of the HTML-based Web page content of each Web page.

36. A mobile hand-held device, comprising:
a processor,
a wireless communications device, to facilitate wireless communication with a network that supports access to the Internet;
a display; and
flash memory, operatively coupled to the processor, in which a plurality of instructions are stored that when executed by the processor enable the mobile hand-held device to perform operations including,
rendering a browser interface via which a user is enabled to request access to a Web page comprising HTML-based Web content defining an original page layout, functionality, and design of content on the Web page;
retrieving the Web page via the wireless communications device, and processing HTML-based Web content to produce scalable content; and
employing at least one of the scalable content or data derived therefrom to,
render the Web page on the display; and
re-render the display in response to associated user inputs to enable the Web page to be browsed at various zoom levels and panned views while preserving the original page layout, functionality, and design of the Web page content at each zoom level and panned view.

37. The mobile hand-held device of claim 36, wherein the device comprises a mobile phone.

38. The mobile hand-held device of claim 36, wherein the device comprises one of a Personal Digital Assistant (PDA) or hand-held computer.

39. The mobile hand-held device of claim 36, wherein execution of the instructions performs further operations comprising enabling the user to zoom in on a user-selectable portion of a display of the Web page in response to a user interface input.

40. The mobile hand-held device of claim 39, wherein the user interface input enables the user to define an area of a current view of the Web page on which to zoom in on.

41. The mobile hand-held device of claim 36, wherein the display of the Web page is re-rendered in real-time to effect zooming operations.

42. The mobile hand-held device of claim 36, wherein the Web page includes at least one hyperlink, and wherein execution of the instructions performs further operations comprising:
enabling the user to select the hyperlink via the display; and, in response thereto,
retrieving and processing HMTL-based Web content associated with the hyperlink to produce additional scalable content; and
employing at least one of the additional scalable content or data derived therefrom to render the Web content associated with the hyperlink on the display.

43. The mobile hand-held device of claim 36, wherein at least a portion of the scalable content comprises scalable vector-based content.

44. The mobile hand-held device of claim 36, wherein execution of the instructions performs further operations comprising returning the display of the Web page to a previous view in response to a corresponding user input made via the display.

45. The mobile hand-held device of claim 36, wherein execution of the instructions performs further operations comprising enabling a user to pan a view of the Web page in response to a corresponding user input made via the display.

46. The mobile hand-held device of claim 36, wherein execution of the instructions performs further operations comprising enabling the panned view of the Web page to be panned in real-time.

47. The mobile hand-held device of claim 36, wherein the page layout of the Web page is defined to have an original aspect ratio, and wherein said at least one of scalable content or data derived therefrom is scaled to render a display of the Web page having a different aspect ratio.

48. The mobile hand-held device of claim 36, wherein execution of the instructions performs further operations comprising enabling a user to zoom on a column of the Web content via a corresponding user input, wherein in response thereto, the display is re-rendered such that content corresponding to the selected column is rendered to fit across the display.

49. The mobile hand-held device of claim 48, wherein the content of the column is reformatted to fit characteristics of the display when the display is re-rendered.

50. The mobile hand-held device of claim 48, wherein the corresponding user input comprises tapping on the column via the display.

51. The mobile hand-held device of claim 36, wherein the Web content includes at least one image, and wherein execution of the instructions performs further operations comprising enabling a user to zoom on an image via a corresponding user input, wherein in response thereto, the display is re-rendered such that the image is rendered to fit across the display.

52. The mobile hand-held device of claim 51, wherein the corresponding user input comprises tapping on the image via the display.

53. The mobile hand-held device of claim 36, wherein execution of the instructions performs further operations comprising enabling a user to zoom on a paragraph of the Web page via a corresponding user input, wherein in response thereto, the display is re-rendered such that content corresponding to the selected paragraph is rendered to fit across a display area of the display.

54. The mobile hand-held device of claim 53, wherein the content of the paragraph is reformatted to fit characteristics of the display area when the display is re-rendered.

55. The mobile hand-held device of claim 53, wherein the corresponding user input comprises tapping on the paragraph via the display.

56. The mobile hand-held device of claim 36, wherein the Web page includes text, layout attributes, and images, and wherein execution of the instructions performs further operations comprising:
receiving content corresponding to the text and layout attributes via a first connection; and
receiving content corresponding to at least one image via a second connection.

57. The mobile hand-held device of claim 36, further comprising dynamic memory having at least a portion employed for rendering purposes, wherein execution of the instructions performs further operations comprising:
building a display list via use of the scalable content and rendering display list content on a virtual display in the dynamic memory; and
scaling the display list content to re-render the display of the Web page.

58. The mobile hand-held device of claim 36, wherein execution of the instructions performs further operations comprising:
parsing HTML-based code corresponding to the retrieved Web page to determine the original page layout of the content on the Web page;
logically grouping selected content into objects;
defining a primary datum corresponding to the original page layout; and,
for each object,
defining an object datum corresponding to a layout location datum for the object's associated display content;
generating a vector from the primary datum to the object datum for the object; and
creating a reference that links the object to the vector that is generated.

59. The mobile hand-held device of claim 58, wherein execution of the instructions performs further operations comprising:
generating a bounding box for each object, the bounding box representing a portion of a rendered display page occupied by the object's associated group of content.

60. The mobile hand-held device of claim 59, further comprising dynamic memory having at least a portion employed for rendering purposes, wherein execution of the instructions performs further operations comprising:
mapping the object vectors and associated bounding boxes to a virtual display in the dynamic memory.

61. The mobile hand-held device of claim 60, wherein execution of the instructions performs further operations comprising:
enabling a user to view the Web page at a user-selectable zoom level and panned view by,
determining a first scale factor and offset in response to one or more corresponding user inputs defining a user-selectable zoom level and panned view corresponding to a rendered display of the Web page desired by a user;
determining a virtual display bounding box for the virtual display associated with the first scale factor and offset;
identifying object bounding boxes having at least a portion falling within the virtual display bounding box; and,
for each of such object bounding boxes,
retrieving content associated with that object bounding box;
applying an appropriate scale factor to the content associated with that object bounding box to produce scaled content; and
rendering the portion of scaled content within the virtual display bounding box to render the content on the display.

62. The mobile hand-held device of claim 36, wherein the scalable content includes scalable text content, and wherein execution of the instructions performs further operations comprising scaling a scalable font to render the scalable text content.

63. The mobile hand-held device of claim 36, wherein the original format of the Web page defines a height and width for the Web page, and wherein execution of the instructions performs further operations comprising:
determining an applicable scale factor to display at least one of the width and height of the Web page to fit across a browser display area of the display; and
employing the scale factor to render the browser display area.

64. The mobile hand-held device of claim 36, wherein at least a portion of the instructions comprise Java-based instructions.

65. The mobile hand-held device of claim 36, wherein a portion of the HTML-based Web content comprises XML code.

66. The mobile hand-held device of claim 36, wherein a portion of the HTML-based Web content comprises cascaded style sheet data defining aspects of the Web page design that are preserved at each zoom level and panned view.

67. The mobile hand-held device of claim 36, wherein the network comprises a Local Area Network or Wide Area Network.

68. The mobile hand-held device of claim 36, wherein the device comprises one of a notebook computer or laptop computer.

69. The mobile device of claim 36, wherein the device enables a user to browse, zoom, and pan billions of Web pages in a manner that preserves the original layout, functionality, and design of the HTML-based Web a e content of each Web page.

70. A mobile device, comprising:
processing means;
wireless communications means, to facilitate wireless communication with a network that supports access to the Internet;
a display, to facilitate user input and display rendered content; and
storage means, in which a plurality of instructions are stored,
wherein, upon execution of the instructions by the processing means, the mobile device is enabled to perform operations, including,
rendering a browser interface via which a user is enabled to request access to a Web page comprising HTML-based Web content defining an original page layout, functionality, and design of content on the Web page;
retrieving the Web page via the wireless communications means, and processing at least a portion of the HTML-based Web content to produce scalable content; and employing at least one of the scalable content or data derived therefrom to,
  render the Web page on the display; and
  re-render the display in response to associated user inputs made via the display to enable the Web page to be browsed at various zoom levels and panned views while preserving the original page layout, functionality, and design of the Web page content at each zoom level and panned view of the Web page.

71. The mobile device of claim 70, wherein the processing means includes a general-purpose processor.

72. The mobile device of claim 70, wherein the processing means includes a special-purpose processor.

73. The mobile device of claim 70, wherein execution of the instructions performs further operations comprising enabling the user to zoom in on a user-selectable portion of a display of the Web page in response to a user interface input.

74. The mobile device of claim 73, wherein the user interface input enables the user to define an area of a current view of the Web page on which to zoom in on.

75. The mobile device of claim 70, wherein the display of the Web page is re-rendered in real-time to effect zooming operations.

76. The mobile device of claim 70, wherein execution of the instructions performs further operations comprising enabling a user to pan a view of the Web content in response to a corresponding user interface input made via the display.

77. The mobile device of claim 70, wherein execution of the instructions performs further operations comprising enabling the view of the Web content to be panned in real-time.

78. The mobile device of claim 70, wherein the Web content includes at least one image, and wherein execution of the instructions performs further operations comprising enabling a user to zoom on an image via a corresponding user input, wherein in response thereto, the display is re-rendered such that the image is rendered to fit across the display.

79. The mobile device of claim 78, wherein the corresponding user input comprises tapping on the image via the display.

80. The mobile device of claim 70, further comprising dynamic memory having at least a portion employed for rendering purposes, wherein execution of the instructions performs further operations comprising:
  building a display list via use of the scalable content and rendering display list objects on a virtual display in the dynamic memory; and
  scaling display list objects to re-render the display of the Web page.

81. The mobile device of claim 70, wherein the network comprises a mobile service provider network.

82. The mobile device of claim 70, wherein the device comprises a mobile phone.

83. The mobile device of claim 70, wherein the device comprises one of a Personal Digital Assistant (PDA) or hand-held computer.

84. The mobile device of claim 70, wherein a portion of the scalable content comprises vector-based content.

85. The mobile device of claim 70, wherein the processing means includes logic circuitry programmed with a portion of the instructions.

86. The mobile device of claim 70, wherein the device comprises one of a notebook computer or laptop computer.

87. A mobile hand-held device, comprising:
  a processor,
  a wireless communications interface, to facilitate wireless communication with a network that supports access to the Internet;
  a display; and
  non-volatile memory, operatively coupled to the processor, in which a plurality of instructions are stored that when executed by the processor enable the mobile hand-held device to perform operations including,
    rendering a browser interface on the display via which a user is enabled to request access to a Web page comprising HTML-based Web content defining an original page layout, functionality, and design of content on the Web page;
    in response to a user request of the Web page,
      retrieving the Web page via the wireless communications interface;
      rendering the Web page such that a width of the Web page is rendered to fit across the display; and
      re-rendering the display in response to associated user inputs to enable the Web page to be browsed at various zoom levels and panned views while preserving the original page layout, functionality, and design of the Web a e content at each zoom level and panned view.

88. The mobile hand-held device of claim 87, wherein execution of the instructions performs further operations comprising enabling a user to zoom on a column of the Web page via a corresponding user input, wherein in response thereto, the display is re-rendered such that content corresponding to the selected column is enlarged.

89. The mobile hand-held device of claim 88, wherein the content of the column is reformatted to fit characteristics of the display when the display is re-rendered.

90. The mobile hand-held device of claim 88, wherein the corresponding user input comprises tapping on the column via the display.

91. The mobile hand-held device of claim 88, wherein the display is re-rendered such that content corresponding to the selected column is rendered to fit across the display.

92. The mobile hand-held device of claim 87, wherein the Web page includes at least one image, and wherein execution of the instructions performs further operations comprising enabling a user to zoom on an image via a corresponding user input, wherein in response thereto, the display is re-rendered such that the image is enlarged.

93. The mobile hand-held device of claim 92, wherein the corresponding user input comprises tapping on the image via the display.

94. The mobile hand-held device of claim 92, wherein the display is re-rendered such that the image is rendered to fit across the display.

95. The mobile hand-held device of claim 87, wherein execution of the instructions performs further operations comprising enabling a user to zoom on a paragraph of the Web page via a corresponding user input, wherein in response thereto, the display is re-rendered such that content corresponding to the selected paragraph is enlarged.

96. The mobile hand-held device of claim 95, wherein the content of the paragraph is reformatted to fit characteristics of the display when re-rendered.

97. The mobile hand-held device of claim 95, wherein the corresponding user input comprises tapping on the paragraph via the display.

98. The mobile hand-held device of claim 95, wherein the display is re-rendered such that content corresponding to the selected paragraph is rendered to fit across the display.

99. The mobile hand-held device of claim 87, wherein execution of the instructions performs further operations comprising enabling a user to pan a view of the web page while in a zoomed state under which a portion of the web page is displayed.

100. The mobile hand-held device of claim 87, wherein execution of the instructions performs further operations comprising returning the display of the Web page to a previous view in response to a corresponding user input.

101. The mobile hand-held device of claim 87, wherein the display of the Web page is re-rendered in real-time to effect zooming operations.

102. The mobile hand-held device of claim 87, wherein execution of the instructions performs further operations comprising enabling a user to pan a view of the Web page in response to a corresponding user input made via the display.

103. The mobile hand-held device of claim 87, wherein execution of the instructions performs further operations comprising enabling the view of the Web page to be panned in real-time.

104. The mobile hand-held device of claim 87, wherein the Web page includes text, layout attributes, and images, and wherein execution of the instructions performs further operations comprising:
    receiving content corresponding to the text and layout attributes via a first connection; and
    receiving content corresponding to at least one image via a second connection.

105. The mobile hand-held device of claim 87, wherein a portion of the HTML-based Web content comprises XML code.

106. The mobile hand-held device of claim 87, wherein a portion of the HTML-based Web content comprises cascaded style sheet data defining aspects of the Web page design that are preserved at each zoom level and panned view.

107. The mobile hand-held device of claim 87, wherein the network comprises a mobile service provider network.

108. The mobile hand-held device of claim 87, wherein the device comprises a mobile phone.

109. The mobile hand-held device of claim 87, wherein the device comprises one of a Personal Digital Assistant (PDA) or hand-held computer.

110. The mobile device of claim 87, wherein the network comprises a Local Area Network or a Wide Area Network.

111. The mobile hand-held device of claim 87, wherein the device enables a user to browse, zoom, and pan billions of Web pages in a manner that preserves the original layout, functionality, and design of the HTML-based Web page content of each Web page.

112. A wireless device, comprising:
    a processor;
    a wireless communications interface, to facilitate wireless communication with a network that supports access to the Internet;
    a display;
    memory; and
    a storage device, on which a plurality of instructions are stored that when executed by the processor enable the wireless device to perform operations including,
        rendering a browser interface via which a user is enabled to request access to a Web page, the Web page comprising HTML-based Web content having an original format including HTML code defining an original page layout, functionality, and design of corresponding content on the Web page;
        retrieving, via the wireless communications interface, and translating at least a portion of the HTML-based Web content into scalable content that supports a scalable resolution-independent representation of the Web page that preserves the original page layout, functionality and design of the content defined by its original format when scaled and rendered;
        employing the scalable content to render the Web page on the display using a first scale factor; and
        enabling the Web page to be displayed at a different resolution by scaling the scalable content using a second scale factor to re-render the display,
    wherein the original page layout, functionality, and design of the Web page content are preserved under both the first and second scale factors.

113. The wireless device of claim 112, wherein the display is re-rendered in real-time.

114. The wireless device of claim 112, wherein the device comprises a hand-held device.

115. The wireless device of claim 112, wherein the device comprises one of a desktop computer, notebook computer or laptop computer.

116. The wireless device of claim 112, wherein execution of the instructions performs further operations comprising enabling a user to pan a view of the Web page in response to a corresponding user input.

117. The wireless device of claim 116, wherein execution of the instructions performs further operations comprising enabling the view of the Web page to be panned in real-time.

118. A method, comprising:
    rendering a browser interface on a display of a device via which a user is enabled to request access to a Web page, the Web page comprising HTML-based Web content having an original format defining an original width and height of the Web page and an original page layout, functionality, and design of content on the Web page;
    in response to a user request to access the Web page,
        retrieving the Web page via the device, and translating at least a portion of the HTML-based Web content from its original format into scalable content that supports a scalable resolution-independent representation of the Web page that preserves the original page layout, functionality and design of the content defined by its original format when scaled and rendered; and
        scaling the scalable content to render the Web page on the display such that a width of the Web page is rendered to fit across the display.

119. The method of claim 118, further comprising enabling the user to zoom in on a user-selectable portion of a display of the Web page in response to a corresponding user interface input.

120. The method of claim 119, wherein the display of the Web page is re-rendered in real-time to effect zooming operations.

121. The method of claim 118, wherein the Web page includes at least one hyperlink, the method further comprising:
    enabling the user to select the hyperlink; and, in response thereto,
        retrieving and translating Web content associated with the hyperlink to produce additional scalable content; and
        employing the additional scalable content to render the Web content associated with the hyperlink on the display.

122. The method of claim 118, further comprising:
    parsing markup language code to determine the original page layout of display content within the Web page, wherein the original page layout defines a layout location for a plurality of objects, including at least one of text objects, graphic layout objects, or graphic image objects included in the Web page;

defining a primary datum corresponding to the original page layout; and, for each object, defining an object datum corresponding to the layout location for the object;

generating a vector from the primary datum to the object datum for the object; and creating a reference that links the object to the vector that is generated.

123. The method of claim 118, further comprising enabling the Web page to be displayed at different resolutions by scaling the scalable content to re-render the display in response to associated user inputs, wherein the original page layout, functionality, and design of the Web page content are preserved at each of the different resolutions.

124. The method of claim 118, further comprising returning the display of the Web page to a previous view in response to a corresponding user input.

125. The method of claim 118, further comprising enabling a user to pan a view of the Web page in response to a corresponding user input.

126. The method of claim 125, further comprising enabling the view of the Web page to be panned in real-time.

127. The method of claim 118, wherein the page layout of the Web page is defined to have an original aspect ratio, and wherein the scalable content is scaled when rendered so as to produce a display of the Web page having a different aspect ratio.

128. The method of claim 118, further comprising enabling a user to zoom on a column of the Web page via a corresponding user input, wherein in response thereto, the display is re-rendered such that content corresponding to the selected column is rendered to fit across the display.

129. The method of claim 128, wherein the corresponding user input comprises tapping on the column via the display.

130. The method of claim 128, wherein the content of the column is reformatted to fit characteristics of the display when the display is re-rendered.

131. The method of claim 118, wherein the Web content includes at least one image, the method further comprising enabling a user to zoom on an image via a corresponding user input, wherein in response thereto, the display is re-rendered such that the image is rendered to fit across the display.

132. The method of claim 131, wherein the corresponding user input comprises tapping on the image via the display.

133. The method of claim 118, further comprising enabling a user to zoom on a paragraph of the Web content via a corresponding user input, wherein in response thereto, the display is re-rendered such that content corresponding to the selected paragraph is rendered to fit across the display.

134. The method of claim 133, wherein the corresponding user input comprises tapping on the paragraph via the display.

135. The method of claim 133, wherein the content of the paragraph is reformatted to fit characteristics of the display when the display is re-rendered.

136. The method of claim 118, wherein the Web page includes text, layout attributes, and images, the method further comprising:

receiving content corresponding to the text and layout attributes via a first connection; and receiving content corresponding to at least one image via a second connection.

137. The method of claim 118, further comprising:

generating a vector-based display list associated with the scalable content; and employing the display list to re-render the display at different scale factors to zoom the Web page.

138. The method of claim 118, further comprising:

parsing markup language code corresponding to the retrieved Web page to determine the original page layout of the content on the Web page;

logically grouping selected content into objects;

defining a primary datum corresponding to the original page layout; and, for each object, defining an object datum corresponding to a layout location datum for the object's associated display content;

generating a vector from the primary datum to the object datum for the object; and creating a reference that links the object to the vector that is generated.

139. The method of claim 138, further comprising:

generating a bounding box for each object, the bounding box representing a portion of a rendered display page occupied by the object's associated group of content.

140. The method of claim 139, further comprising:

mapping the object vectors and associated bounding boxes to a virtual display in memory.

141. The method of claim 140, further comprising:

enabling a user to view the Web page at a user-selectable zoom level and panned view by, determining a first scale factor and offset in response to one or more corresponding user inputs defining a user-selectable zoom level and panned view corresponding to a rendered display of the Web page desired by a user; and determining a virtual display bounding box for the virtual display associated with the first scale factor and offset;

identifying object bounding boxes having at least a portion falling within the virtual display bounding box; and, for each of such object bounding boxes, retrieving content associated with that object bounding box;

applying an appropriate scale factor to the content associated with that object bounding box to produce scaled content; and rendering the portion of scaled content within the virtual display bounding box to render the content on the display.

142. The method of claim 118, wherein the scalable content includes scalable text content, the method further comprising scaling a scalable font to render the scalable text content.

143. The method of claim 118, wherein the method is facilitated, at least in part, via execution of Java-based instructions.

144. The method of claim 118, wherein the device comprises a mobile phone.

145. The method of claim 118, wherein the device comprises a hand-held device.

146. The method of claim 118, further comprising accessing the Internet via a wireless connection to retrieve the Web page.

147. The method of claim 118, wherein a portion of the scalable content comprises vector-based content.

148. The method of claim 118, wherein the device comprises one of a desktop computer, notebook computer or laptop computer.

149. A method, comprising:
rendering a browser interface on a hand-held device via which a user is enabled to request access to a Web page comprising HTML-based Web content defining an original page layout, functionality, and design of content on the Web page;
retrieving the Web page via the hand-held device, and processing HTML-based Web content to produce scalable content; and
employing at least one of the scalable content or data derived therefrom to,
render the Web page on a display of the hand-held device; and
re-render the display in response to associated user inputs to enable the Web page to be browsed at various zoom levels and panned views while preserving the original page layout, functionality, and design of the Web page content at each zoom level and panned view.

150. The method of claim 149, wherein the hand-held device comprises a mobile phone.

151. The method of claim 149, wherein the hand-held device comprises one of a Personal Digital Assistant (PDA) or hand-held computer.

152. The method of claim 149, further comprising enabling the user to zoom in on a user-selectable portion of a display of the Web page in response to a user interface input.

153. The method of claim 152, wherein the user interface input enables the user to define an area of a current view of the Web page on which to zoom in on.

154. The method of claim 149, wherein the display of the Web page is re-rendered in real-time to effect zooming operations.

155. The method of claim 149, wherein the Web page includes at least one hyperlink, the method further comprising:
enabling the user to select the hyperlink via the display; and, in response thereto,
retrieving and processing HMTL-based Web content associated with the hyperlink to produce additional scalable content; and
employing at least one of the additional scalable content or data derived therefrom to render the Web content associated with the hyperlink on the display.

156. The method of claim 149, wherein at least a portion of the scalable content comprises scalable vector-based content.

157. The method of claim 149, further comprising returning the display of the Web page to a previous view in response to a corresponding user input made via the display.

158. The method of claim 149, further comprising enabling a user to pan a view of the Web page in response to a corresponding user input made via the display.

159. The method of claim 149, further comprising enabling the view of the Web page to be panned in real-time.

160. The method of claim 149, wherein the page layout of the Web page is defined to have an original aspect ratio, and wherein said at least one of scalable content or data derived therefrom is scaled to render a display of the Web page having a different aspect ratio.

161. The method of claim 149, further comprising enabling a user to zoom on a column of the Web content via a corresponding user input, wherein in response thereto, the display is re-rendered such that content corresponding to the selected column is enlarged.

162. The method of claim 161, wherein the corresponding user input comprises tapping on the column via the display.

163. The method of claim 161, wherein the content of the column is reformatted to fit characteristics of the display when the display is re-rendered.

164. The method of claim 161, wherein the display is re-rendered such that content corresponding to the selected column is rendered to fit across the display.

165. The method of claim 149, wherein the Web content includes at least one image, the method further comprising enabling a user to zoom on an image via a corresponding user input, wherein in response thereto, the display is re-rendered such that the image is enlarged.

166. The method of claim 165, wherein the corresponding user input comprises tapping on the image via the display.

167. The method of claim 165, wherein the display is re-rendered such that the image is rendered to fit across the display.

168. The method of claim 149, further comprising enabling a user to zoom on a paragraph of the Web page via a corresponding user input, wherein in response thereto, the display is re-rendered such that content corresponding to the selected paragraph is enlarged.

169. The method of claim 168, wherein the content of the paragraph is reformatted to fit characteristics of the display area when the display is re-rendered.

170. The method of claim 168, wherein the display is re-rendered such that content corresponding to the selected paragraph is rendered to fit across the display.

171. The method of claim 168, wherein the corresponding user input comprises tapping on the paragraph via the display.

172. The method of claim 149, wherein the Web page includes text, layout attributes, and images, the method further comprising:
receiving content corresponding to the text and layout attributes via a first connection; and
receiving content corresponding to at least one image via a second connection.

173. The method of claim 149, wherein the hand-held device includes dynamic memory having at least a portion employed for rendering purposes, the method further comprising:
building a display list via use of the scalable content and rendering display list content on a virtual display in dynamic memory; and
scaling the display list content to re-render the display of the Web page.

174. The method of claim 149, further comprising:
parsing HTML-based code corresponding to the retrieved Web page to determine the original page layout of the content on the Web page;
logically grouping selected content into objects;
defining a primary datum corresponding to the original page layout; and,
for each object,
defining an object datum corresponding to a layout location datum for the object's associated display content;
generating a vector from the primary datum to the object datum for the object; and
creating a reference that links the object to the vector that is generated.

175. The method of claim 174, further comprising:
generating a bounding box for each object, the bounding box representing a portion of a rendered display page occupied by the object's associated group of content.

176. The method of claim 175, wherein the hand-held device includes dynamic memory having at least a portion employed for rendering purposes, the method further comprising:
mapping the object vectors and associated bounding boxes to a virtual display in the dynamic memory.

177. The method of claim 176, further comprising:
enabling a user to view the Web page at a user-selectable zoom level and panned view by,
determining a first scale factor and offset in response to one or more corresponding user inputs defining a user-selectable zoom level and panned view corresponding to a rendered display of the Web page desired by a user;
determining a virtual display bounding box for the virtual display associated with the first scale factor and offset;
identifying object bounding boxes having at least a portion falling within the virtual display bounding box; and,
for each of such object bounding boxes,
retrieving content associated with that object bounding box;
applying an appropriate scale factor to the content associated with that object bounding box to produce scaled content; and
rendering the portion of scaled content within the virtual display bounding box to render the content on the display.

178. The method of claim 149, wherein the scalable content includes scalable text content, the method further comprising scaling a scalable font to render the scalable text content.

179. The method of claim 149, wherein the original format of the Web page defines a height and width for the Web page, the method further comprising:
determining an applicable scale factor to display at least one of the width and height of the Web page across a browser display area of the display; and
employing the scale factor to render the browser display area.

180. The method of claim 149, wherein the method is facilitated, at least in part, via execution of Java-based instructions.

181. The method of claim 149, wherein a portion of the HTML-based Web content comprises XML code.

182. The method of claim 149, wherein a portion of the HTML-based Web content comprises cascaded style sheet data defining aspects of the Web page design that are preserved at each zoom level and panned view.

183. The method of claim 149, wherein a portion of the scalable content comprises vector-based content.

184. The method of claim 149, further comprising enabling a user to browse, zoom, and pan billions of Web pages in a manner that preserves the original layout, functionality, and design of the HTML-based Web page content of each Web page.

185. A method, comprising:
rendering a browser interface on a display of a device via which a user is enabled to request access to a Web page comprising HTML-based Web content defining an original page layout, functionality, and design of content on the Web page;
in response to a user request of the Web page via the browser interface,
retrieving the Web page via the device;
rendering the Web page via the device such that a full width of the Web page is rendered on the display; and
re-rendering the Web page in response to associated user inputs to the hand-held device to enable the Web page to be browsed at various zoom levels and panned views while preserving the original page layout, functionality, and design of the Web page content at each zoom level and panned view of the Web page,
wherein the method enables a user of the device to browse, zoom, and pan billions of Web pages in a manner that preserves the original layout, functionality, and design of the HTML-based Web page content of each Web page.

186. The method of claim 185, further comprising enabling a user to zoom on a column of the Web page via a corresponding user input, wherein in response thereto, the display is re-rendered such that content corresponding to the selected column is enlarged.

187. The method of claim 186, wherein the corresponding user input comprises tapping on the column via the display.

188. The method of claim 186, wherein the content of the column is reformatted to fit characteristics of the display when the display is re-rendered.

189. The method of claim 186, wherein the display is re-rendered such that content corresponding to the selected column is rendered to fit across the display.

190. The method of claim 185, wherein the Web page includes at least one image, the method further comprising enabling a user to zoom on an image via a corresponding user input, wherein in response thereto, the display is re-rendered such that the image is enlarged.

191. The method of claim 190, wherein the corresponding user input comprises tapping on the image via the display.

192. The method of claim 190, wherein the display is re-rendered such that the image is rendered to fit across the display.

193. The method of claim 185, further comprising enabling a user to zoom on a paragraph of the Web page via a corresponding user input, wherein in response thereto, the display is re-rendered such that content corresponding to the selected paragraph is enlarged.

194. The method of claim 193, wherein the corresponding user input comprises tapping on the paragraph via the display.

195. The method of claim 193, wherein the content of the paragraph is reformatted to fit characteristics of the display when re-rendered.

196. The method of claim 193, wherein the display is re-rendered such that content corresponding to the selected paragraph is rendered to fit across the display.

197. The method of claim 185, further comprising enabling a user to pan a view of the web page while in a zoomed state under which a portion of the web page is displayed in response to a user input made via the display.

198. The method of claim 185, further comprising returning the display of the Web page to a previous view in response to a corresponding user input.

199. The method of claim 185, wherein the display of the Web page is re-rendered in real-time to effect zooming operations.

200. The method of claim 185, further comprising enabling a user to pan a view of the Web page in response to a corresponding user input made via the display.

201. The method of claim 185, further comprising enabling the view of the Web page to be panned in real-time.

202. The method of claim 185, wherein the Web page includes text, layout attributes, and images, the method further comprising:
  receiving content corresponding to the text and layout attributes via a first connection; and
  receiving content corresponding to at least one image via a second connection.

203. The method of claim 185, wherein a portion of the HTML-based Web content comprises XML code.

204. The method of claim 185, wherein a portion of the HTML-based Web content comprises cascaded style sheet data defining aspects of the Web page design that are preserved at each zoom level and panned view.

205. The method of claim 185, wherein the Web page is retrieved via a wireless connection to one of a mobile service provider network, local area network, or wide area network.

206. The method of claim 185, wherein the device comprises a mobile phone.

207. The method of claim 185, wherein the device comprises a hand-held device.

208. The method of claim 185, wherein the device comprises one of a desktop computer, notebook computer or laptop computer.

209. A method, comprising:
  rendering a browser interface on a display via which a user of a device is enabled to request access to a Web page, the Web page comprising HTML-based Web content having an original format including HTML code defining an original page layout, functionality, and design of corresponding content on the Web page;
  retrieving the Web page, via the device, and translating at least a portion of the HTML-based Web content into scalable content that supports a scalable resolution-independent representation of the Web page that preserves the original page layout, functionality and design of the content defined by its original format when scaled and rendered; and
  employing the scalable content to render the Web page on the display using a first scale factor; and
  enabling the Web page to be displayed at a different resolution by scaling the scalable content using a second scale factor to re-render the display,
  wherein the original page layout, functionality, and design of the Web page content are preserved under both the first and second scale factors.

210. The method of claim 209, wherein the display is re-rendered in real-time.

211. The method of claim 209, wherein the device comprises a hand-held device.

212. The method of claim 209, wherein the device comprises one of a desktop computer, notebook computer or laptop computer.

213. The method of claim 209, further comprising enabling a user to pan a view of the Web page in response to a corresponding user input.

214. The method of claim 213, further comprising enabling the view of the Web page to be panned in real-time.

215. The method of claim 209, further comprising enabling a user to browse, zoom, and pan billions of Web pages in a manner that preserves the original layout, functionality, and design of the HTML-based Web page content of each Web page.

216. A machine-readable medium having a plurality of instructions tangibly stored thereon, which when executed enable a device to perform operations comprising:
  rendering a browser interface via which a user is enabled to request access to a Web page hosted by an Internet Web site, the Web page comprising HTML-based Web content having an original format defining an original width and height of the Web page and an original page layout, functionality, and design of content on the Web page;
  retrieving the Web page via the wireless communication means, and translating at least a portion of the HTML-based Web content from its original format into scalable content that supports a scalable resolution-independent representation of the Web page that preserves the original page layout, functionality and design of the content defined by its original format when scaled and rendered; and
  scaling the scalable content to render the Web page on the display such that a width of the Web page is rendered to fit across the display.

217. The machine-readable medium of claim 216, wherein execution of the instructions performs further operations comprising enabling the user to zoom in on a user-selectable portion of a display of the Web page in response to a corresponding user interface input.

218. The machine-readable medium of claim 217, wherein the display of the Web page is re-rendered in real-time to effect zooming operations.

219. The machine-readable medium of claim 216, wherein the Web page includes at least one hyperlink, and wherein execution of the instructions performs further operations comprising:
  enabling the user to select the hyperlink; and, in response thereto,
    retrieving and translating Web content associated with the hyperlink to produce additional scalable content; and
    employing the additional scalable content to render the Web content associated with the hyperlink on the display.

220. The machine-readable medium of claim 216, wherein execution of the instructions performs further operations comprising:
  parsing markup language code to determine the original page layout of display content within the Web page, wherein the original page layout defines a layout location for a plurality of objects, including at least one of text objects, graphic layout objects, or graphic image objects included in the Web page;
  defining a primary datum corresponding to the original page layout; and,
  for each object,
    defining an object datum corresponding to the layout location for the object;
    generating a vector from the primary datum to the object datum for the object; and
    creating a reference that links the object to the vector that is generated.

221. The machine-readable medium of claim 216, wherein execution of the instructions performs further operations comprising enabling the Web page to be displayed at different resolutions by scaling the scalable content to re-render the display in response to associated user inputs,
  wherein the original page layout, functionality, and design of the Web page content are preserved at each of the different resolutions.

222. The machine-readable medium of claim 216, wherein execution of the instructions performs further operations comprising returning the display of the Web page to a previous view in response to a corresponding user input.

223. The machine-readable medium of claim 216, wherein execution of the instructions performs further operations comprising enabling a user to pan a view of the Web page in response to a corresponding user input.

224. The machine-readable medium of claim 223, wherein execution of the instructions performs further operations comprising enabling the view of the Web page to be panned in real-time.

225. The machine-readable medium of claim 216, wherein the page layout of the Web page is defined to have an original aspect ratio, and wherein the scalable content is scaled when rendered so as to produce a display of the Web page having a different aspect ratio.

226. The machine-readable medium of claim 216, wherein execution of the instructions performs further operations comprising enabling a user to zoom on a column of the Web page via a corresponding user input, wherein in response thereto, the display is re-rendered such that content corresponding to the selected column is enlarged.

227. The machine-readable medium of claim 226, wherein the corresponding user input comprises tapping on the column via the display.

228. The machine-readable medium of claim 226, wherein the display is re-rendered such that content corresponding to the selected column is rendered to fit across the display.

229. The machine-readable medium of claim 226, wherein the content of the column is reformatted to fit characteristics of the display when the display is re-rendered.

230. The machine-readable medium of claim 216, wherein the Web content includes at least one image, and wherein execution of the instructions performs further operations comprising enabling a user to zoom on an image via a corresponding user input, wherein in response thereto, the display is re-rendered such that the image is enlarged.

231. The machine-readable medium of claim 230, wherein the corresponding user input comprises tapping on the image via the display.

232. The machine-readable medium of claim 230, wherein the display is re-rendered such that the image is rendered to fit across the display.

233. The machine-readable medium of claim 216, wherein execution of the instructions performs further operations comprising enabling a user to zoom on a paragraph of the Web content via a corresponding user input, wherein in response thereto, the display is re-rendered such that content corresponding to the selected paragraph is enlarged.

234. The machine-readable medium of claim 233, wherein the corresponding user input comprises tapping on the paragraph via the display.

235. The machine-readable medium of claim 233, wherein the content of the paragraph is reformatted to fit characteristics of the display when the display is re-rendered.

236. The machine-readable medium of claim 233, wherein the display is re-rendered such that content corresponding to the selected paragraph is rendered to fit across the display.

237. The machine-readable medium of claim 216, wherein the Web page includes text, layout attributes, and images, and wherein execution of the instructions performs further operations comprising:
receiving content corresponding to the text and layout attributes via a first connection; and
receiving content corresponding to at least one image via a second connection.

238. The machine-readable medium of claim 216, wherein execution of the instructions performs further operations comprising:
generating a vector-based display list associated with the scalable content; and
employing the display list to re-render the display at different scale factors to zoom the Web page.

239. The machine-readable medium of claim 216, wherein execution of the instructions performs further operations comprising:
parsing markup language code corresponding to the retrieved Web page to determine the original page layout of the content on the Web page;
logically grouping selected content into objects;
defining a primary datum corresponding to the original page layout; and,
for each object,
defining an object datum corresponding to a layout location datum for the object's associated display content;
generating a vector from the primary datum to the object datum for the object; and
creating a reference that links the object to the vector that is generated.

240. The machine-readable medium of claim 239, wherein execution of the instructions performs further operations comprising:
generating a bounding box for each object, the bounding box representing a portion of a rendered display page occupied by the object's associated group of content.

241. The machine-readable medium of claim 240, wherein execution of the instructions performs further operations comprising:
mapping the object vectors and associated bounding boxes to a virtual display in memory.

242. The machine-readable medium of claim 241, wherein execution of the instructions performs further operations comprising:
enabling a user to view the Web page at a user-selectable zoom level and panned view by,
determining a first scale factor and offset in response to one or more corresponding user inputs defining a user-selectable zoom level and panned view corresponding to a rendered display of the Web page desired by a user; and
determining a virtual display bounding box for the virtual display associated with the first scale factor and offset;
identifying object bounding boxes having at least a portion falling within the virtual display bounding box; and,
for each of such object bounding boxes,
retrieving content associated with that object bounding box;
applying an appropriate scale factor to the content associated with that object bounding box to produce scaled content; and
rendering the portion of scaled content within the virtual display bounding box to render the content on the display.

243. The machine-readable medium of claim 216, wherein the scalable content includes scalable text content, and wherein execution of the instructions performs further operations comprising scaling a scalable font to render the scalable text content.

244. The machine-readable medium of claim 216, wherein at least a portion of the instructions comprise Java-based instructions.

245. The machine-readable medium of claim 216, wherein the device comprises a mobile phone.

246. The machine-readable medium of claim 216, wherein the device comprises a hand-held device.

247. The machine-readable medium of claim 216, wherein the Web page is accessed via a mobile service provider network.

248. The machine-readable medium of claim 216, wherein a portion of the scalable content comprises vector-based content.

249. The machine-readable medium of claim 216, wherein the device comprises one of a desktop computer, notebook computer or laptop computer.

250. The machine-readable medium of claim 216, wherein the instructions are embodied as a Web browser.

251. The machine-readable medium of claim 216, wherein execution of the instructions enables a user to browse, zoom, and pan billions of Web pages in a manner that preserves the original layout, functionality, and design of the HTML-based Web page content of each Web page.

252. A machine-readable medium having a plurality of instructions comprising a Web browser tangibly stored thereon, which when executed enable a device to perform operations comprising:
rendering a browser interface on a display associated with the device via which a user is enabled to request access to a Web page comprising HTML-based Web content defining an original page layout, functionality, and design of content on the Web page;
retrieving the Web page and processing HTML-based Web content to produce scalable content; and
employing at least one of the scalable content or data derived therefrom to,
render the Web page on the display; and
re-render the display in response to associated user inputs to enable the Web page to be browsed at various zoom levels and panned views while preserving the original page layout, functionality, and design of the Web page content at each zoom level and panned view of the Web page,
wherein the Web browser enables a user of the device to browse, zoom, and pan billions of Web pages in a manner that preserves the original layout, functionality, and design of the HTML-based Web page content of each Web page at each zoom level and panned view.

253. The machine-readable medium of claim 252, wherein the device comprises a mobile phone.

254. The machine-readable medium of claim 252, wherein the device comprises a hand-held device.

255. The machine-readable medium of claim 252, wherein execution of the instructions performs further operations comprising enabling the user to zoom in on a user-selectable portion of a display of the Web page in response to a user interface input.

256. The machine-readable medium of claim 255, wherein the user interface input enables the user to define an area of a current view of the Web page on which to zoom in on.

257. The machine-readable medium of claim 252, wherein the display of the Web page is re-rendered in real-time to effect zooming operations.

258. The machine-readable medium of claim 252, wherein the Web page includes at least one hyperlink, and wherein execution of the instructions performs further operations comprising:
enabling the user to select the hyperlink; and, in response thereto,
retrieving and processing HMTL-based Web content associated with the hyperlink to produce additional scalable content; and
employing at least one of the additional scalable content or data derived therefrom to render the Web content associated with the hyperlink on the display.

259. The machine-readable medium of claim 252, wherein at least a portion of the scalable content comprises scalable vector-based content.

260. The machine-readable medium of claim 252, wherein execution of the instructions performs further operations comprising returning the display of the Web page to a previous view in response to a corresponding user input made via the display.

261. The machine-readable medium of claim 252, wherein execution of the instructions performs further operations comprising enabling a user to pan a view of the Web page in response to a corresponding user input made via the display.

262. The machine-readable medium of claim 252, wherein execution of the instructions performs further operations comprising enabling the view of the Web page to be panned in real-time.

263. The machine-readable medium of claim 252, wherein the page layout of the Web page is defined to have an original aspect ratio, and wherein said at least one of scalable content or data derived therefrom is scaled to render a display of the Web page having a different aspect ratio.

264. The machine-readable medium of claim 252, wherein execution of the instructions performs further operations comprising enabling a user to zoom on a column of the Web content via a corresponding user input, wherein in response thereto, the display is re-rendered such that content corresponding to the selected column is rendered to fit across the display.

265. The machine-readable medium of claim 264, wherein the corresponding user input comprises tapping on the column via the display.

266. The machine-readable medium of claim 264, wherein the content of the column is reformatted to fit characteristics of the display when the display is re-rendered.

267. The machine-readable medium of claim 252, wherein the Web content includes at least one image, and wherein execution of the instructions performs further operations comprising enabling a user to zoom on an image via a corresponding user input, wherein in response thereto, the display is re-rendered such that the image is rendered to fit across the display.

268. The machine-readable medium of claim 267, wherein the corresponding user input comprises tapping on the image via the display.

269. The machine-readable medium of claim 252, wherein execution of the instructions performs further operations comprising enabling a user to zoom on a paragraph of the Web page via a corresponding user input, wherein in response thereto, the display is re-rendered such that content corresponding to the selected paragraph is rendered to fit across a browser display area of the display.

270. The machine-readable medium of claim 269, wherein the corresponding user input comprises tapping on the paragraph via the display.

271. The machine-readable medium of claim 269, wherein the content of the paragraph is reformatted to fit characteristics of the display area when the display is re-rendered.

272. The machine-readable medium of claim 252, wherein the Web page includes text, layout attributes, and images, and wherein execution of the instructions performs further operations comprising:
receiving content corresponding to the text and layout attributes via a first connection; and receiving content corresponding to at least one image via a second connection.

273. The machine-readable medium of claim 252, wherein the device includes dynamic memory having at least a portion employed for rendering purposes, and wherein execution of the instructions performs further operations comprising:
building a display list via use of the scalable content and rendering display list content on a virtual display in the dynamic memory; and
scaling the display list content to re-render the display of the Web page.

274. The machine-readable medium of claim 252, wherein execution of the instructions performs further operations comprising:
parsing HTML-based code corresponding to the retrieved Web page to determine the original page layout of the content on the Web page;
logically grouping selected content into objects;
defining a primary datum corresponding to the original page layout; and,
for each object,
defining an object datum corresponding to a layout location datum for the object's associated display content;
generating a vector from the primary datum to the object datum for the object; and
creating a reference that links the object to the vector that is generated.

275. The machine-readable medium of claim 274, wherein execution of the instructions performs further operations comprising:
generating a bounding box for each object, the bounding box representing a portion of a rendered display page occupied by the object's associated group of content.

276. The machine-readable medium of claim 275, wherein the device includes dynamic memory having at least a portion employed for rendering purposes, and wherein execution of the instructions performs further operations comprising:
mapping the object vectors and associated bounding boxes to a virtual display in the dynamic memory.

277. The machine-readable medium of claim 276, wherein execution of the instructions performs further operations comprising:
enabling a user to view the Web page at a user-selectable zoom level and panned view by,
determining a first scale factor and offset in response to one or more corresponding user inputs defining a user-selectable zoom level and panned view corresponding to a rendered display of the Web page desired by a user;
determining a virtual display bounding box for the virtual display associated with the first scale factor and offset;
identifying object bounding boxes having at least a portion falling within the virtual display bounding box; and,
for each of such object bounding boxes,
retrieving content associated with that object bounding box;
applying an appropriate scale factor to the content associated with that object bounding box to produce scaled content; and
rendering the portion of scaled content within the virtual display bounding box to render the content on the display.

278. The machine-readable medium of claim 252, wherein the scalable content includes scalable text content, and wherein execution of the instructions performs further operations comprising scaling a scalable font to render the scalable text content.

279. The machine-readable medium of claim 252, wherein the original format of the Web page defines a height and width for the Web page, and wherein execution of the instructions performs further operations comprising:
determining an applicable scale factor to display at least one of the width and height of the Web page across a browser display area of the display; and
employing the scale factor to render the browser display area.

280. The machine-readable medium of claim 252, wherein at least a portion of the instructions comprise Java-based instructions.

281. The machine-readable medium of claim 252, wherein a portion of the HTML-based Web content comprises XML code.

282. The machine-readable medium of claim 252, wherein a portion of the HTML-based Web content comprises cascaded style sheet data defining aspects of the Web page design that are preserved at each zoom level and panned view.

283. The machine-readable medium of claim 252, wherein a portion of the scalable content comprises vector-based content.

284. The machine-readable medium of claim 252, wherein the device comprises one of a desktop computer, notebook computer or laptop computer.

285. A machine-readable medium having a plurality of instructions tangibly stored thereon, which when executed enable a wireless device to perform operations comprising:
rendering a browser interface on a display of the wireless device via which a user is enabled to request access to a Web page comprising HTML-based Web content defining an original page layout, functionality, and design of content on the Web page;
in response to a user request of the Web page,
retrieving the Web page via the wireless device;
rendering the Web page such that a width of the Web page is rendered to fit across the display; and
re-rendering the Web page in response to associated user inputs to enable the Web page to be browsed at various zoom levels and panned views while preserving the original page layout, functionality, and design of the Web page content at each zoom level and panned view.

286. The machine-readable medium of claim 285, wherein execution of the instructions performs further operations comprising enabling a user to zoom on a column of the Web page via a corresponding user input, wherein in response thereto, the display is re-rendered such that content corresponding to the selected column is enlarged.

287. The machine-readable medium of claim 286, wherein the corresponding user input comprises tapping on the column via the display.

288. The machine-readable medium of claim 286, wherein the content of the column is reformatted to fit characteristics of the display when the display is re-rendered.

289. The machine-readable medium of claim 286, wherein the display is re-rendered such that content corresponding to the selected column is rendered to fit across the display.

290. The machine-readable medium of claim 285, wherein the Web page includes at least one image, and wherein execution of the instructions performs further operations comprising enabling a user to zoom on an image via a corresponding user input, wherein in response thereto, the display is re-rendered such that the image is enlarged.

291. The machine-readable medium of claim 290, wherein the corresponding user input comprises tapping on the image via the display.

292. The machine-readable medium of claim 290, wherein the display is re-rendered such that the image is rendered to fit across the display.

293. The machine-readable medium of claim 285, wherein execution of the instructions performs further operations comprising enabling a user to zoom on a paragraph of the Web page via a corresponding user input, wherein in response thereto, the display is re-rendered such that content corresponding to the selected paragraph is enlarged.

294. The machine-readable medium of claim 293, wherein the corresponding user input comprises tapping on the paragraph via the display.

295. The machine-readable medium of claim 293, wherein the content of the paragraph is reformatted to fit characteristics of the display when re-rendered.

296. The machine-readable medium of claim 293, wherein the display is re-rendered such that content corresponding to the selected paragraph is rendered to fit across the display.

297. The machine-readable medium of claim 285, wherein execution of the instructions performs further operations comprising enabling a user to pan a display of the web page while in a zoomed state under which a portion of the web page is displayed.

298. The machine-readable medium of claim 285, wherein execution of the instructions performs further operations comprising returning the display of the Web page to a previous view in response to a corresponding user input.

299. The machine-readable medium of claim 285, wherein the display of the Web page is re-rendered in real-time to effect zooming operations.

300. The machine-readable medium of claim 285, wherein execution of the instructions performs further operations comprising enabling a user to pan a view of the Web page in response to a corresponding user input made via the display.

301. The machine-readable medium of claim 285, wherein execution of the instructions performs further operations comprising enabling the view of the Web page to be panned in real-time.

302. The machine-readable medium of claim 285, wherein the Web page includes text, layout attributes, and images, and wherein execution of the instructions performs further operations comprising:
  receiving content corresponding to the text and layout attributes via a first connection; and
  receiving content corresponding to at least one image via a second connection.

303. The machine-readable medium of claim 285, wherein a portion of the HTML-based Web content comprises XML code.

304. The machine-readable medium of claim 285, wherein a portion of the HTML-based Web content comprises cascaded style sheet data defining aspects of the Web page design that are preserved at each zoom level and panned view.

305. The machine-readable medium of claim 285, wherein the wireless device is configured to connect to a mobile service provider network and retrieve the Web page via the mobile service provider network.

306. The machine-readable medium of claim 285, wherein the wireless device comprises a mobile phone.

307. The machine-readable medium of claim 285, wherein the wireless device comprises a hand-held device.

308. The machine-readable medium of claim 285, wherein the wireless device comprises one of a notebook computer or laptop computer.

309. The machine-readable medium of claim 285, wherein the instructions are embodied as a Web browser.

310. The machine-readable medium of claim 285, wherein execution of the instructions enables a user to browse, zoom, and pan billions of Web pages in a manner that preserves the original layout, functionality, and design of the HTML-based Web page content of each Web page.

311. A machine-readable medium having a plurality of instructions comprising a Web browser stored thereon, which when executed enable a device to perform operations comprising:
  launching a Web browser including a browser interface via which a user is enabled to request access to a Web page, the Web page comprising HTML-based Web content having an original format including HTML code defining an original page layout, functionality, and design of corresponding content on the Web page;
  retrieving, and translating at least a portion of the HTML-based Web content into scalable content that supports a scalable resolution-independent representation of the Web page that preserves the original page layout, functionality and design of the content defined by its original format when scaled and rendered; and
  employing the scalable content to render the Web page on the Web browser using a first scale factor; and
  enabling the Web page to be displayed at a different resolution by scaling the scalable content using a second scale factor to re-render the Web page on the Web browser,
  wherein the original page layout, functionality, and design of the Web page content are preserved under both the first and second scale factors, and
  wherein the Web browser enables a user of the device to browse billions of Web pages at multiple scale factors in a manner that preserves the original layout, functionality, and design of the HTML-based Web page content of each Web page at each scale factor.

312. The machine-readable medium of claim 311, wherein the display is re-rendered in real-time.

313. The machine-readable medium of claim 311, wherein the Web browser is configured to be installed on a hand-held device.

314. The machine-readable medium of claim 311, wherein the Web browser is configured to be installed on at least one of a desktop computer, notebook computer or laptop computer.

315. The machine-readable medium of claim 311, wherein execution of the instructions performs further operations comprising enabling a user to pan a view of the Web page in response to a corresponding user input.

316. The machine-readable medium of claim 315, wherein execution of the instructions performs further operations comprising enabling the view of the Web page to be panned in real-time.

317. A hand-held wireless device, comprising:
  a processor,
  a wireless communications interface, to facilitate wireless communication with a network that supports access to the Internet;
  a display; and
  non-volatile memory, operatively coupled to the processor, in which software comprising a browser is stored, the browser comprising a plurality of instructions that when executed by the processor enable the device to perform operations including,
    rendering a browser interface on the display via which a user is enabled to request access to a Web page including at least one image, at least one column, at least one hyperlink to an external reference and having a width and height;

retrieving the Web page via the wireless communications interface;

rendering the Web page on the display such that at least one of the width and height of the Web page is fully displayed; and enabling the user to, zoom and pan a view of the Web page;

activate a currently displayed hyperlink to an external reference while at a given zoom level and panned view, wherein in response to an activation of a hyperlink to an external reference, Web content associated with the external reference is retrieved and rendered on the display;

zoom in on an image of the Web page by tapping on the image via the display;

zoom in on a column of the Web page by tapping on the column via the display; and zoom out to a previous view of the Web page.

318. The hand-held wireless device of claim 317, wherein the Web page comprises HTML-based Web page content defining an original page layout, functionality, and design of the Web page content, and wherein the browser renders the Web page such that the original page layout, functionality, and design of the Web page are preserved at any selectable zoom level.

319. The hand-held wireless device of claim 318, wherein the user is enabled to browse, zoom, and pan billions of Web pages in a manner that preserves the original layout, functionality, and design of the HTML-based Web page content of each Web page.

* * * * *

UNITED STATES PATENT AND TRADEMARK OFFICE
CERTIFICATE OF CORRECTION

PATENT NO. : 7,461,353 B2  Page 1 of 1
APPLICATION NO. : 11/045757
DATED : December 2, 2008
INVENTOR(S) : Gary B. Rohrabaugh and Scott A. Sherman It is certified that error appears in the above-identified patent and that said Letters Patent is hereby corrected as shown below:

In Claim 69,
    at Col. 28, line 43, add --hand-held-- between "mobile" and "device"; and
    at Col. 28, line 46, delete "a e" between "Web" and "content" such that the claim recites,
    "69. The mobile hand-held device of claim 36, wherein the device enables a user to browse, zoom, and pan billions of Web pages in a manner that preserves the original layout, functionality, and design of the HTML-based Web content of each Web page".

In Claim 185,
    at Col. 38, line 7, delete "hand-held" prior to "device" such that the subparagraph recites,
    "re-rendering the Web page in response to associated user inputs to the device ...".

In Claim 216,
    Col. 40, line 5, replace "the" wireless communication means with --a-- wireless communications means, such that the subparagraph recites,
    "retrieving the Web page via a wireless communication means, ...".

Signed and Sealed this

Twenty-first Day of April, 2009

JOHN DOLL
*Acting Director of the United States Patent and Trademark Office*

(12) INTER PARTES REVIEW CERTIFICATE (110th)
United States Patent (10) Number: US 7,461,353 K1
Rohrabaugh et al. (45) Certificate Issued: Jan. 12, 2016

(54) SCALABLE DISPLAY OF INTERNET CONTENT ON MOBILE DEVICES

(75) Inventors: Gary B. Rohrabaugh; Scott A. Sherman

(73) Assignee: SOFTVIEW L.L.C.

Trial Numbers:

IPR2013-00007 filed Oct. 2, 2012
IPR2013-00256 filed Apr. 29, 2013

Petitioners: Kyocera Corporation; Motorola Mobility LLC

Patent Owner: Softview LLC

Inter Partes Review Certificate for:

Patent No.: 7,461,353
Issued: Dec. 2, 2008
Appl. No.: 11/045,757
Filed: Jan. 28, 2005

The results of joined IPR2013-00007 and IPR2013-00256 are reflected in this inter partes review certificate under 35 U.S.C. 318(b).

INTER PARTES REVIEW CERTIFICATE
U.S. Patent 7,461,353 K1
Trial No. IPR2013-00007
Certificate Issued Jan. 12, 2016

AS A RESULT OF THE INTER PARTES REVIEW PROCEEDING, IT HAS BEEN DETERMINED THAT:

Claims 1, 33, 36, 43, 48, 51, 52, 58, 59, 66, 118, 138, 139, 149, 183, 252, 283 and 317 are cancelled.

\* \* \* \* \*